(12) United States Patent
Yamada et al.

(10) Patent No.: US 9,726,403 B2
(45) Date of Patent: Aug. 8, 2017

(54) REFRIGERATION CYCLE DEVICE

(71) Applicant: DENSO CORPORATION, Kariya, Aichi-pref. (JP)

(72) Inventors: Etsuhisa Yamada, Kariya (JP);
Yoshiaki Takano, Kosai (JP);
Haruyuki Nishijima, Obu (JP);
Hiroshi Oshitani, Toyota (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 205 days.

(21) Appl. No.: 14/433,439

(22) PCT Filed: Sep. 5, 2013

(86) PCT No.: PCT/JP2013/005277
§ 371 (c)(1),
(2) Date: Apr. 3, 2015

(87) PCT Pub. No.: WO2014/057607
PCT Pub. Date: Apr. 17, 2014

(65) Prior Publication Data
US 2015/0253045 A1    Sep. 10, 2015

(30) Foreign Application Priority Data
Oct. 8, 2012 (JP) ................. 2012-223750

(51) Int. Cl.
*F24B 13/00* (2006.01)
*F25B 30/02* (2006.01)
(Continued)

(52) U.S. Cl.
CPC ......... *F25B 30/02* (2013.01); *B60H 1/00921* (2013.01); *F25B 5/04* (2013.01);
(Continued)

(58) Field of Classification Search
CPC ............. F25B 13/00; F25B 1/00; Y02B 30/62
(Continued)

(56) References Cited

U.S. PATENT DOCUMENTS

2003/0131611 A1    7/2003    Oshitani et al.
2003/0182961 A1    10/2003   Nishida et al.
(Continued)

FOREIGN PATENT DOCUMENTS

JP    H07132729 A    5/1995
JP    H09089416 A    4/1997
(Continued)

OTHER PUBLICATIONS

International Search Report and Written Opinion (in Japanese with English Translation) for PCT/JP2013/005277, mailed Dec. 17, 2013; ISA/JP.
(Continued)

*Primary Examiner* — Melvin Jones
(74) *Attorney, Agent, or Firm* — Harness, Dickey & Pierce, P.L.C.

(57) ABSTRACT

In an air cooling mode of cooling air as a fluid to be heat-exchanged, a refrigeration cycle device is provided to perform switching to a refrigerant circuit in which a high-pressure refrigerant exchanging heat with outside air in an exterior heat exchanger and dissipating heat therefrom flows into an accumulator serving as a gas-liquid separator. In an air heating mode of heating the air, the refrigeration cycle device also performs switching to another refrigerant circuit that allows a low-pressure refrigerant decompressed by a first expansion valve to flow into the accumulator. Thus, even in any operation mode, a difference between a refrigerant temperature in the accumulator and the outside air temperature is reduced to thereby suppress the degradation of performance of the refrigeration cycle device due to the
(Continued)

AIR COOLING MODE unnecessary transfer of heat between the refrigerant in the accumulator and the outside air.

16 Claims, 20 Drawing Sheets

(51) Int. Cl.
    *F25B 5/04* (2006.01)
    *F25B 6/04* (2006.01)
    *B60H 1/00* (2006.01)
    *B60H 1/32* (2006.01)

(52) U.S. Cl.
    CPC ...... *F25B 6/04* (2013.01); *B60H 2001/00942* (2013.01); *B60H 2001/3298* (2013.01); *F25B 2341/0662* (2013.01); *F25B 2400/04* (2013.01); *F25B 2400/13* (2013.01); *F25B 2400/23* (2013.01)

(58) Field of Classification Search
    USPC .................................. 62/324.1, 498, 324.6
    See application file for complete search history.

(56) References Cited

U.S. PATENT DOCUMENTS

2004/0060316 A1    4/2004    Ito et al.
2009/0199581 A1*    8/2009    Ushijima ................ F25B 30/02
    62/238.7
2010/0205987 A1*    8/2010    Okazaki .................. F25B 9/008
    62/190

FOREIGN PATENT DOCUMENTS

| JP | H10297270 A | 11/1998 |
|----|-------------|---------|
| JP | 2000016072 A | 1/2000 |
| JP | 2000052757 A | 2/2000 |
| JP | 2002286326 A | 10/2002 |
| JP | 2003207218 A | 7/2003 |
| JP | 2004219009 A | 8/2004 |
| JP | 2007145104 A | 6/2007 |
| JP | 3966044 B2 | 8/2007 |
| JP | 4311115 B2 | 8/2009 |
| JP | 2009198060 A | 9/2009 |

OTHER PUBLICATIONS

Office Action dated Nov. 27, 2015 issued in the corresponding CN application No. 201380052305.0 in Chinese with English translation.

Office Action dated Jul. 7, 2015 in corresponding Japanese Application No. 2012-223750.

* cited by examiner

AIR COOLING MODE

AIR HEATING MODE

AIR COOLING MODE

AIR HEATING MODE

AIR COOLING MODE

AIR HEATING MODE

AIR COOLIING MODE

AIR HEATING MODE

AIR COOLING MODE

AIR HEATING MODE

AIR COOLING MODE

AIR HEATING MODE

AIR COOLING MODE

AIR HEATING MODE

AIR COOLING MODE

AIR HEATING MODE

AIR COOLIING MODE / AIR HEATING MODE

AIR HEATING MODE

AIR COOLING MODE

AIR HEATING MODE

AIR HEATING MODE

AIR COOLIING MODE / AIR HEATING MODE

AIR HEATING MODE

AIR COOLIING MODE

AIR HEATING MODE

AIR HEATING MODE

AIR COOLING MODE

AIR HEATING MODE

AIR HEATING MODE

AIR COOLIING MODE

AIR HEATING MODE

AIR HEATING MODE

AIR COOLIING MODE / SECOND AIR HEATING MODE

AIR HEATING MODE

SECOND AIR HEATING MODE (FIRST MODE)

SECOND AIR HETING MODE (SECOND MODE)

SECOND AIR HEATING MODE (THIRD MODE)

AIR COOLING MODE / SECOND AIR HEATING MODE

AIR HEATING MODE

//REFRIGERATION CYCLE DEVICE

CROSS REFERENCE TO RELATED APPLICATIONS

This application is a U.S. National Phase Application under 35 U.S.C. 371 of International Application No. PCT/JP2013/005277 filed on Sep. 5, 2013 and published in Japanese as WO 2014/057607 A1 on Apr. 17, 2014. This application is based on and claims the benefit of priority from Japanese Patent Application 2012-223750 filed on Oct. 8, 2012. The entire disclosures of all of the above applications are incorporated herein by reference.

FIELD OF THE INVENTION

The present disclosure relates to a refrigeration cycle device including a gas-liquid separator for separating a refrigerant into gas and liquid phases.

BACKGROUND ART

In a related art, for example, Patent Document 1 discloses a vapor compression refrigeration cycle device that is applied to an air conditioner. The refrigeration cycle device can be configured to switch between an operation mode (e.g., air heating mode) of heating a space to be air-conditioned by heating air (fluid to be heat-exchanged) to be blown into the space to be air-conditioned, and another operation mode (e.g., air cooling mode) of cooling the space to be air-conditioned by cooling the air.

The refrigeration cycle device disclosed in Patent Document 1 further includes an accumulator (gas-liquid separator) that separates a low-pressure refrigerant into gas and liquid phases, and stores therein an excessive liquid-phase refrigerant. Even when switching to either of the operation modes, the low-pressure gas-phase refrigerant separated by the accumulator is drawn into a compressor.

RELATED ART DOCUMENT

Patent Document

Patent Document 1: Japanese Patent Publication No. 4311115

SUMMARY OF INVENTION

The inventors of the present application have found through their studies that the accumulator in Patent Document 1 is disposed in an external space exposed to outside air and located outside the space to be air-conditioned, causing the following problems. That is, a low-pressure refrigerant in the accumulator might absorb heat from the outside air when there is a large difference in temperature between the outside air and the low-pressure refrigerant in the accumulator, like in the air cooling mode at a relatively high outside air temperature.

Such unnecessary absorption of heat by the low-pressure refrigerant from the outside air in the accumulator reduces the amount of heat absorbed from the air to be blown into the space to be air-conditioned, thereby leading to degradation of the air cooling performance of the refrigeration cycle device. That is, the unnecessary transfer of heat between the outside air and the refrigerant in the accumulator disposed in the external space causes the degradation of performance of the refrigeration cycle device.

In view of the foregoing points, it is an object of the present disclosure to suppress the degradation of performance of a refrigeration cycle device due to the unnecessary transfer of heat between the refrigerant in a gas-liquid separator and the outside air.

To achieve the above object, a refrigeration cycle device of the present disclosure includes a compressor, a heating heat exchanger, first and second decompression devices, a cooling heat exchanger and a gas-liquid separator. The compressor compresses and discharges a refrigerant. The heating heat exchanger exchanges heat between a high-pressure refrigerant discharged from the compressor and a fluid to be heat-exchanged, to heat the fluid to be heat-exchanged. The first decompression device and the second decompression device decompress a refrigerant on a downstream side of the heating heat exchanger. The cooling heat exchanger exchanges heat between the refrigerant flowing out of the second decompression device and the fluid to be heat-exchanged, to cool the fluid to be heat-exchanged, while allowing the refrigerant to flow into a suction side of the compressor. The gas-liquid separator is disposed in an external space exposed to an outside air, and separates the refrigerant into gas and liquid phases.

Furthermore, in a cooling mode of cooling the fluid to be heat-exchanged, the high-pressure refrigerant flows into the gas-liquid separator via the first decompression device. In contrast, in a heating mode of heating the fluid to be heat-exchanged, the refrigerant on the downstream side of the heating heat exchanger is decompressed by the first decompression device to a lower pressure than that in the cooling mode, and then flows into the gas-liquid separator.

Thus, in the cooling mode, the high-pressure refrigerant flows into the gas-liquid separator without being decompressed by the first decompression device, so that the refrigeration temperature in the gas-liquid separator can be set to a relatively high temperature. Here, cooling of a fluid to be heat-exchanged is generally carried out when outside air temperature is high. Therefore, in the cooling mode, the refrigerant temperature in the gas-liquid separator is set to the relatively high temperature, so as to suppress the increase in difference between the refrigerant temperature in the gas-liquid separator disposed in the external space and the outside air temperature.

On the other hand, in the heating mode, the low-pressure refrigerant decompressed by the first decompression device flows into the gas-liquid separator, so that the refrigeration temperature in the gas-liquid separator can be set to a relatively low temperature. Here, heating of a fluid to be heat-exchanged is generally carried out when outside air temperature is low. Therefore, in the heating mode, the refrigerant temperature in the gas-liquid separator is set to the relatively low temperature, so as to suppress the increase in difference between the refrigerant temperature in the gas-liquid separator disposed in the external space and the outside air temperature.

As a result, according to the disclosure, in any operation mode, the increase in difference between the refrigerant temperature in the gas-liquid separator disposed in the external space and the outside air temperature can be reduced to thereby suppress the degradation of performance of the refrigeration cycle device due to the unnecessary transfer of heat between the refrigerant in the gas-liquid separator and the outside air.

Note that the term "refrigerant flowing out of the second decompression device" as used in the present disclosure means not only the refrigerant decompressed by and flowing out of the second decompression device, but also the refrigerant flowing out of the second decompression device without being decompressed.

Further, the refrigeration cycle device may include an exterior heat exchanger and a refrigerant circuit switch. The exterior heat exchanger exchanges heat between the refrigerant on the downstream side of the heating heat exchanger and the outside air. The refrigerant circuit switch is adapted to switch between refrigerant circuits for the refrigerant circulating through a cycle.

Specifically, for example, in the refrigerant circuit for the cooling mode, the refrigerant circuit switch causes the refrigerant flowing out of the heating heat exchanger to flow into the exterior heat exchanger, and then causes the refrigerant flowing out of the exterior heat exchanger to flow into the gas-liquid separator. In the refrigerant circuit for the heating mode, the refrigerant circuit switch decompresses the refrigerant flowing out of the heating heat exchanger by the first decompression device, and then causes the refrigerant decompressed by the first decompression device to flow into the gas-liquid separator.

Thus, in the cooling mode, the high-pressure refrigerant exchanging heat with the outside air in the exterior heat exchanger flows into the gas-liquid separator, so that the refrigeration temperature in the gas-liquid separator can be substantially equal to the outside air temperature. Therefore, in the cooling mode, there is little transfer of heat between the outside air and the refrigerant in the gas-liquid separator disposed in the external space. As a result, the present disclosure can more effectively suppress the degradation of the performance of the refrigeration cycle device due to the unnecessary transfer of heat between the outside air and the refrigerant in the vapor-liquid separator.

DESCRIPTION OF EMBODIMENTS

First Embodiment

A first embodiment of the present disclosure will be described below with reference to FIGS. 1 to 4. In this embodiment, a refrigeration cycle device 10 of the present disclosure is applied to a vehicle air conditioner 1 to be mounted on an electric vehicle that is designed to obtain a driving force for vehicle traveling from an electric motor for traveling. The refrigeration cycle device 10 serves to heat or cool air to be blown into a vehicle interior as a space to be air-conditioned in the vehicle air conditioner 1. Thus, a fluid to be heat-exchanged in this embodiment is air.

Figure 1:
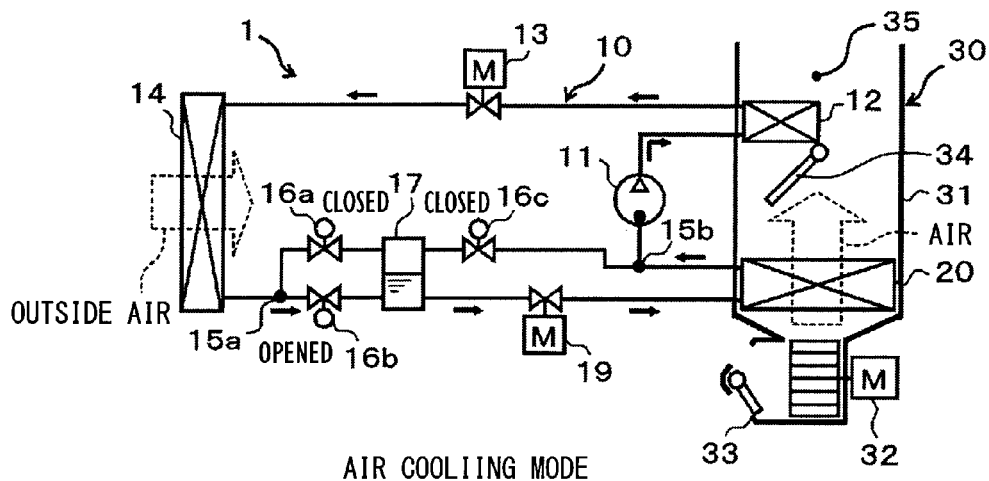
FIG. 1 is an entire configuration diagram showing a refrigerant circuit in an air cooling mode of a refrigeration cycle device according to a first embodiment.
Figure 2:
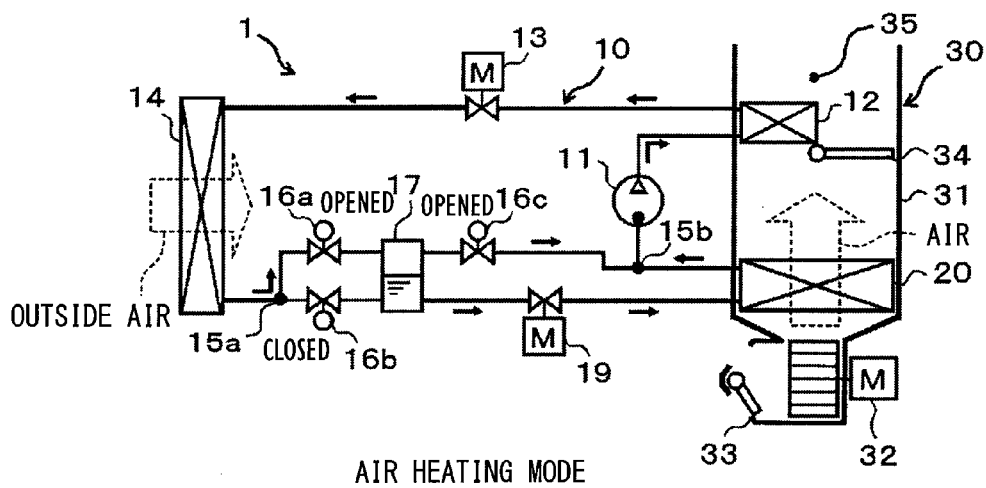
FIG. 2 is an entire configuration diagram showing a refrigerant circuit in an air heating mode of the refrigeration cycle device in the first embodiment.

As shown in FIGS. 1 and 2, the refrigeration cycle device 10 can be configured to switch between a refrigerant circuit in an air cooling mode (cooling mode) of cooling the vehicle interior by cooling the air (see FIG. 1), and another refrigerant circuit in an air heating mode (heating mode) of heating the vehicle interior by heating the air (see FIG. 2). FIGS. 1 and 2 show the flows of the refrigerant in the respective operation modes by solid arrows.

The refrigeration cycle device 10 employs a hydrofluorocarbon (HFC) refrigerant (for example, R134a) as the refrigerant, and forms an evaporation compression type subcritical refrigeration cycle whose high-pressure side refrigerant pressure Pd does not exceed the critical pressure of the refrigerant. Obviously, a hydrofluoro-olefin (HFO) refrigerant (for example, R1234yf) or the like may be used. Refrigerating machine oil for lubricating the compressor 11 is mixed into the refrigerant, and a part of the refrigerating machine oil circulates through the cycle together with the refrigerant.

A compressor 11 among components of the refrigeration cycle device 10 is positioned in a vehicle bonnet, and is to draw, compress, and discharge the refrigerant in the refrigeration cycle device 10. The compressor is an electric compressor which drives a fixed displacement compression mechanism with a fixed discharge capacity by use of an electric motor. The electric motor of the compressor 11 has its operation (the number of revolutions) controlled by a control signal output from an air conditioning controller to be described later.

The discharge port side of the compressor 11 is connected to a refrigerant inlet side of an interior condenser 12. The interior condenser 12 is disposed in a casing 31 forming an air passage for air to be blown into the vehicle interior, in an interior air conditioning unit 30 to be described later. The interior condenser 12 is a heating heat exchanger that heats the air by exchanging heat between high-pressure refrigerant discharged from the compressor 11 and the air having passed through an interior evaporator 20 to be described later. The details of the interior air conditioning unit 30 will be described later.

A refrigerant outlet side of the interior condenser 12 is connected to an inlet side of a first expansion valve 13 serving as a first decompression device that decompresses the refrigerant flowing out of the interior condenser 12 in the air heating mode. The first expansion valve 13 is an electric variable throttle mechanism including a valve body whose opening degree is adjustable, and an electric actuator having a stepping motor for changing the opening degree of the valve body. The first expansion valve 13 has its operation controlled by a control signal output from the air conditioning controller.

The first expansion valve 13 is the variable throttle mechanism with a fully opening function that serves as a single refrigerant passage by fully opening its opening degree while hardly exhibiting any refrigerant decompressing effect. The outlet side of the first expansion valve 13 is connected to the refrigerant inlet side of an exterior heat exchanger 14. The exterior heat exchanger 14 is disposed in the bonnet of the vehicle, and serves to exchange heat between the refrigerant circulating therethrough and outside air blown from a blower fan (not shown).

More specifically, the exterior heat exchanger 14 of this embodiment serves as a radiator for dissipating heat from a high-pressure refrigerant in the air cooling mode, and as an evaporator for evaporating a low-pressure refrigerant in the air heating mode. A blower fan is an electric blower whose operating ratio, that is, whose number of revolutions (volume of air to be blown) is controlled by a control voltage output from the air conditioning controller.

The refrigerant outlet side of the exterior heat exchanger 14 is connected to a gas-phase side inlet and a liquid-phase side inlet of the accumulator 17 via a branch portion 15a. The branch portion 15a is formed of a three-way coupling having three inflow and outflow ports, one of which is a refrigerant inflow port, and the remaining two of which are refrigerant outflow ports.

A refrigerant passage leading from one of the refrigerant outflow ports of the branch portion 15a to the gas-phase side inflow port of the accumulator 17 is provided with a gas-phase inlet side opening/closing valve 16a that opens and closes the refrigerant passage. Another refrigerant passage leading from the other refrigerant outflow port of the branch portion 15a to the liquid-phase side inflow port of the accumulator 17 is provided with a liquid-phase inlet side opening/closing valve 16b for opening and closing the refrigerant passage.

The accumulator 17 is a gas-liquid separator that separates the refrigerant flowing thereinto into liquid and gas phases, and stores therein the excessive liquid-phase refrigerant in the cycle. The accumulator 17 is disposed inside the vehicle bonnet, that is, in an external space exposed to the outside air. Further, the accumulator 17 is provided with a gas-phase refrigerant outflow port for allowing the separated gas-phase refrigerant to flow therefrom, and a liquid-phase refrigerant outflow port for allowing the separated liquid-phase refrigerant to flow therefrom, in addition to the gas-phase side inflow port and the liquid-phase side inflow port.

The gas-phase refrigerant outflow port is connected to a suction port of the compressor 11 via a merging portion 15b. The merging portion 15b is formed of the same type of three-way coupling structure as the branch portion 15a. The merging portion has three inflow and outflow ports, two of which are refrigerant inflow ports, and the remaining one of which is a refrigerant outflow port. A refrigerant passage leading from the gas-phase refrigerant outflow port of the accumulator 17 to one of the refrigerant inflow ports of the merging portion 15b is provided with a gas-phase outlet side opening/closing valve 16c for opening/closing the refrigerant passage.

Here, all the gas-phase inlet side opening/closing valve 16a, the liquid-phase inlet side opening/closing valve 16b, and the gas-phase outlet side opening/closing valve 16c have the same structure, and are an electromagnetic valve whose operation is controlled by the control signal output from the air conditioning controller. These opening/closing valves 16a to 16c are adapted to open/close the respective refrigerant passages, thereby switching the refrigerant circuit for the refrigerant circulating through the cycle. Therefore, the opening/closing valves 16a to 16c configure a refrigerant circuit switch in this embodiment.

On the other hand, the liquid-phase refrigerant outflow port of the accumulator 17 is connected to the refrigerant inlet side of the interior evaporator 20 via a second expansion valve 19. The second expansion valve 19 is an electric expansion valve having the same structure as that of the first expansion valve 13. The second expansion valve 19 serves as a second decompression device that decompresses the liquid-phase refrigerant separated by the accumulator 17 to flow the decompressed refrigerant out of the expansion valve 19 to a refrigerant inlet side of the interior evaporator 20 in the air cooling mode.

The interior evaporator 20 is disposed on the upstream side of air flow with respect to the above-mentioned interior condenser 12 within the casing 31 of the interior air conditioning unit 30. The interior evaporator 20 is a cooling heat exchanger that cools the air by causing the low-pressure refrigerant having flowed from the second expansion valve 19 to exchange heat with the air to evaporate the refrigerant. The refrigerant outlet of the interior evaporator 20 is connected to the other refrigerant inflow port of the above-mentioned merging portion 15b, and the refrigerant outflow port of the merging portion 15b is connected to the suction port side of the compressor 11.

Next, the interior air conditioning unit 30 will be described below. The interior air conditioning unit 30 serves to blow out the air whose temperature is adjusted by the refrigeration cycle device 10 into the vehicle compartment. The interior air conditioning unit 30 is disposed inside (inside the vehicle compartment) a dashboard (instrument panel) at the foremost part of the vehicle compartment. The interior air conditioning unit 30 accommodates a blower 32, the interior evaporator 20, the interior condenser 12, an air mix door 34, and the like in a casing 31 forming its outer envelope.

The casing 31 forms an air passage for air to be blown into the vehicle interior. The casing 31 has some elasticity, and is formed of resin (for example, polypropylene) having excellent strength. On the most upstream side of the air flow in the casing 31, an inside/outside air switch 33 is provided to serve as an inside/outside air switch for switching between inside air (air in the vehicle interior) and outside air (air outside the vehicle interior) and introducing the air into the casing 31.

The inside/outside air switch 33 continuously adjusts opening areas of an inside air inlet for introducing the inside air into the casing 31 and an outside air inlet for introducing the outside air into the casing 31 by use of an inside/outside air switching door, thereby continuously changing a ratio of the volume of the inside air to the outside air. The inside/outside air switching door is driven by an electric actuator for the inside/outside air switching door. The electric actuator has its operation controlled by a control signal output from the air conditioning controller.

On the downstream side of air flow of the inside/outside air switch 33, the blowing device (blower) 32 is disposed as a blower for blowing air drawn thereinto via the inside/outside air switch 33, toward the vehicle interior. The blower 32 is an electric blower that drives a centrifugal multi-blade fan (sirrocco fan) by an electric motor. The blower 32 has the number of revolutions (i.e., air blowing volume) thereof controlled by a control voltage output from the air conditioning controller.

The interior evaporator 20 and the interior condenser 12 are disposed on the downstream side of the air flow of the blower 32 in that order with respect to the air flow. In short, the interior evaporator 20 is disposed on the upstream side of the air flow with respect to the interior condenser 12. The air mix door 34 is disposed on the downstream side of the air flow in the interior evaporator 20 and on the upstream side of the air flow in the interior condenser 12. The air mix door 34 adjusts the rate of the volume of the air passing through the interior condenser 12 to that of the air having passed through the interior evaporator 20.

A mixing space 35 is provided on the downstream side of the air flow in the interior condenser 12 so as to mix the air heated by exchanging heat with the refrigerant in the interior condenser 12, with the air not heated while bypassing the interior condenser 12. Openings are disposed on the most downstream side of the air flow in the casing 31. The openings are provided to blow out the air (conditioned air) mixed in a mixing space 35, into the vehicle interior as a space to be air-conditioned.

Specifically, the openings include a face opening for blowing the conditioned air toward a passenger' upper body in the vehicle compartment, a foot opening for blowing the conditioned air toward the passenger's foot, and a defroster opening for blowing the conditioned air toward the inner side of a front glass of the vehicle (which openings are not shown). A face air outlet, a foot air outlet, and a defroster air outlet (not shown) provided in the vehicle interior are connected to the downstream sides of the air flows from these face opening, foot opening, and defroster opening, respectively.

Thus, the air mix door 34 adjusts the rate of the volume of air passing through the interior condenser 12 to thereby adjust the temperature of conditioned air mixed in the mixing space 35, thus controlling the temperature of the conditioned air blown from each opening. That is, the air mix door 34 serves as a temperature adjustment unit for adjusting the temperature of the conditioned air to be blown into the vehicle interior.

Note that the air mix door 34 is driven by an electric actuator for driving the air mix door. The electric actuator for driving the air mix door has its operation controlled by the control signal output from the air conditioning controller.

A face door for adjusting an opening area of the face air opening is positioned on the upstream side of the air flow of the face air opening; a foot door for adjusting an opening area of the foot air opening is positioned on the upstream side of the air flow of the foot air opening; and a defroster door for adjusting an opening area of the defroster air opening is positioned on the upstream side of the air flow of the defroster air opening (these doors being not shown).

The face door, foot door, and defroster door serve as an air outlet mode switch for switching among air outlet modes. These doors are coupled to and rotated with the electric actuator for driving an air outlet mode door via a link mechanism. The electric actuator for driving the air outlet mode door has its operation controlled by a control signal output from the air conditioning controller.

The air outlet modes switched by the air outlet mode switch specifically include a face mode of blowing air from the face air outlet toward an upper half of the body of a passenger in the vehicle interior by fully opening the face air outlet; and a bi-level mode of blowing the air toward the upper half of the body and the foot of the passenger in the vehicle by opening both the face air outlet and foot air outlet. The air outlet modes also include a foot mode of blowing air mainly from the foot air outlet by fully opening the foot air outlet while opening the defroster air outlet only by a small opening degree; and a foot defroster mode of blowing air from both the foot air outlet and the defroster air outlet by opening the foot air outlet and the defroster air outlet to the same degree.

Further, a blow-out mode selector switch provided in an operation panel is manually operated by the passenger, so that the defroster air outlet is fully opened to enable setting of a defroster mode of blowing air from the defroster air outlet toward the inner face of the windshield glass of the vehicle.

Next, an electric controller of this embodiment will be described below. The air conditioning controller is constructed of a known microcomputer, including CPU, ROM, RAM, and the like, and a peripheral circuit thereof. The air conditioning controller controls the operations of various devices to be controlled 11, 13, 16a to 16c, 19, 32, and the like which are connected to the output side by performing various kinds of computations and processing based on control programs stored in the ROM.

The input side of the air conditioning controller is connected to an inside air sensor for detecting a vehicle interior temperature (inside air temperature) Tr, an outside air sensor for detecting a vehicle exterior temperature (outside air temperature) Tam, and a solar radiation sensor for detecting an amount of solar radiation As applied to the vehicle interior. Further, the input side of the air conditioning controller is also connected to a high-pressure side refrigerant pressure sensor for detecting a refrigerant pressure (high-pressure side refrigerant pressure) Pd of the refrigerant on the outlet side of the interior condenser 12, as well as a high-pressure side refrigerant temperature sensor for detecting the refrigerant temperature (high-pressure side refrigerant temperature) Td of the refrigerant on the outlet side of the interior condenser 12.

In addition to these sensors, a group of various control sensors is connected to the input side of the air conditioning controller. The various control sensors include an evaporator temperature sensor for detecting a refrigerant evaporation temperature (evaporator temperature) Tefin in the interior evaporator 20, an air temperature sensor for detecting an air temperature TAV of air to be blown from the mixing space into the vehicle interior, and an exterior heat exchanger temperature sensor for detecting an exterior device temperature Ts of the exterior heat exchanger 14.

The evaporator temperature sensor of this embodiment is adapted to detect the temperature of a heat exchanging fin of the interior evaporator 20, but may adopt a temperature detector for detecting the temperature of another part of the interior evaporator 20. The exterior heat exchanger temperature sensor of this embodiment is adapted to detect the temperature of a refrigerant outflow port of the exterior heat exchanger 14, but may adopt a temperature detector for detecting the temperature of another part of the interior evaporator 20.

In this embodiment, the air temperature sensor for detecting the air temperature TAV is provided. As the air temperature TAV, a value calculated based on the evaporator temperature Tefin, the high-pressure side refrigerant temperature Td, and the like may be used.

An operation panel (not shown) is disposed near an instrument board at the front of the vehicle compartment, and coupled to the input side of the air conditioning controller. Operation signals are input from various types of air conditioning operation switches provided on the operation panel.

Specifically, the various types of operation switches provided on the operation panel include an automatic switch for setting or resetting an automatic control operation of the vehicle air conditioner 1, an operation mode selector switch for switching the operation mode, an air volume setting switch for manually setting the volume of air from the blower 32, a temperature setting switch serving as a target temperature setting portion for setting a target temperature Tset of the vehicle interior, the blow-out mode selector switch for manually setting a blow-out mode, and the like.

The air conditioning controller of this embodiment is integrally structured with a control unit for controlling various devices to be controlled connected to an output side of the controller. A structure (hardware and software) for controlling the operations of the respective devices to be controlled configures the unit control for controlling the operation of each device to be controlled.

For example, in the air conditioning controller, the structure (hardware and software) for controlling the operation (refrigerant discharge capacity) of the compressor 11 serves as a compressor control unit. The structure (hardware and software) for controlling the operation of each of the opening/closing valves 16a to 16c configuring the refrigerant circuit switch serves as a refrigerant circuit control unit. It is apparent that the compressor control unit, the refrigerant circuit control unit, and the like may be configured as another separate air conditioning controller with respect to the air conditioning controller.

Next, the operation of the vehicle air conditioner 1 with the above arrangement in this embodiment will be described below. As described above, the vehicle air conditioner 1 of this embodiment can switch its operation between the air cooling mode and the air heating mode.

First, in the air cooling mode, the air conditioning controller closes the gas-phase inlet side opening/closing valve 16a and the gas-phase outlet side opening/closing valve 16c, opens the liquid-phase inlet side opening/closing valve 16b, completely opens the first expansion valve 13, and sets the second expansion valve 19 in a throttle state exhibiting the decompression effect.

Thus, in the air cooling mode, as indicated by solid arrows of FIG. 1, switching is performed to a refrigerant circuit that circulates a refrigerant through the compressor 11, the interior condenser 12, (the first expansion valve 13), the exterior heat exchanger 14, the liquid-phase inlet side opening/closing valve 16b, the accumulator 17, the second expansion valve 19, the interior evaporator 20, and the compressor 11 in that order.

With such a structure of the refrigerant circuit, the air conditioning controller reads a detection signal from the above-mentioned group of sensors for air conditioning control, and an operation signal from the operation panel. The air conditioning controller calculates a target outlet temperature TAO which is a target temperature of air to be blown into the vehicle interior, based on the values of the detection signal and operation signal read. Further, the air conditioning controller determines the operating state of each of various devices to be controlled which are connected to the output side of the air conditioning controller, based on the calculated target outlet temperature TAO and the detection signal from the sensor group.

For example, the refrigerant discharge capacity of the compressor 11, that is, the control signal to be output to the electric motor of the electric motor of the compressor 11 are determined in the following way. First, a target evaporator outlet temperature TEO of the air blown from the interior evaporator 20 is determined based on the target outlet temperature TAO with reference to the control map pre-stored in the air conditioning controller.

Then, a control signal to be output to the electric motor of the compressor 11 is determined based on a deviation between the target evaporator outlet temperature TEO and the evaporator temperature Tefin detected by the evaporator temperature sensor such that the evaporator temperature Tefin approaches the target evaporator outlet temperature TEO by the feedback control.

The opening degree of the second expansion valve 19 is determined such that a degree of superheat of the refrigerant on the suction side of the compressor 11 approaches a predetermined target superheat degree KSH previously defined. A control signal to be output to a servo motor of the air mix door 34 is determined such that the air temperature TAV approaches the target outlet temperature TAO. In the air cooling mode, the air mix door 34 may have its opening degree controlled so as to close an air passage on a side of the interior condenser 12.

A control voltage and a control signal determined as mentioned above are output to respective various devices to be controlled. Then, a control routine is repeated until the operation of the vehicle air conditioner 1 is requested to stop by the operation panel. The control routine involves reading the above-mentioned detection signal and operation signal, calculating the target outlet temperature TAO, determining the operation state of each of various devices to be controlled, and outputting a control signal or the like, every predetermined control cycle. Such repetition of the control routine is also performed in the air heating mode in the same way.

Figure 3:
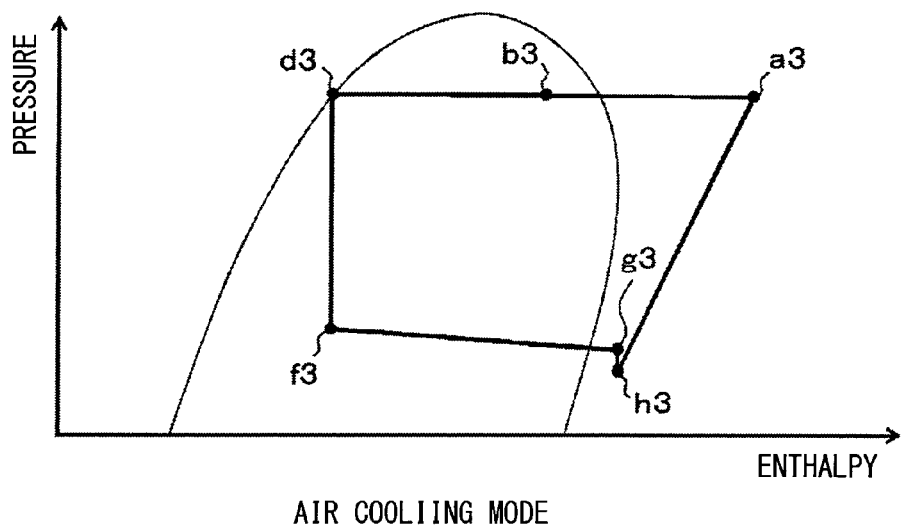
FIG. 3 is a Mollier chart showing the state of refrigerant in the air cooling mode of the refrigeration cycle device in the first embodiment.

Thus, the refrigeration cycle device 10 in the air cooling mode changes the state of the refrigerant as illustrated in a Mollier chart of FIG. 3. Further, a high-pressure refrigerant discharged from the compressor 11 (as indicated at a point a3 in FIG. 3) flows into the interior condenser 12, and exchanges heat with the air to dissipate heat therefrom (as indicated from the point a3 to a point b3 in FIG. 3). In this way, a part of the air having passed through the interior evaporator 20 is heated.

The refrigerant flowing out of the interior condenser 12 flows into the exterior heat exchanger 14 via the first expansion valve 13. At this time, the first expansion valve 13 is fully opened, so that the refrigerant flowing from the interior evaporator 20 flows into the exterior heat exchanger 14 while being hardly decompressed by the first expansion valve 13. The refrigerant flowing into the exterior heat exchanger 14 exchanges heat with the outside air blown from the blower fan to dissipate heat therefrom, thereby decreasing its enthalpy (as indicated from the point b3 to a point d3 in FIG. 3).

The refrigerant flowing out of the exterior heat exchanger 14 flows into the accumulator 17 to be separated into gas and liquid phases because the liquid-phase inlet side opening/closing valve 16b is open. The liquid-phase refrigerant separated by the accumulator 17 flows out of the liquid-phase refrigerant outflow port of the accumulator 17 to flow into the second expansion valve 19. Then, the liquid is decompressed to a low-pressure refrigerant by the second expansion valve 19 (as indicated from the point d3 to a point f3 in FIG. 3).

At this time, the opening degree of the second expansion valve 19 is adjusted such that a degree of superheat of the refrigerant on the suction side of the compressor 11 (at a point h3 in FIG. 3) approaches a target superheat degree KSH. The low-pressure refrigerant decompressed by the second expansion valve 19 flows into the interior evaporator 20, and absorbs heat from the air blown from the blower 32 to evaporate itself (from the point f3 to a point g3 in FIG. 3). Thus, the air is cooled.

The refrigerant flowing from the interior evaporator 20 is drawn into the compressor 11 via the merging portion 15b and compressed again (as indicated from the point h3 to a point a3 in FIG. 3). In the air cooling mode, the gas-phase outlet side opening/closing valve 16c is closed, whereby the gas-phase refrigerant separated by the accumulator 17 does not flow from the gas-phase refrigerant outflow port of the accumulator 17.

The reason why the point g3 differs from the point h3 in FIG. 3 is that the refrigerant drawn into the compressor 11 has a pressure loss due to suction pressure of the compressor 11. Therefore, in an ideal cycle, the point g3 is desirably identical to the point h3. The same goes for the Mollier chart below.

As mentioned above, in the air cooling mode, the air is cooled by the interior evaporator 20 to achieve the air-cooling of the vehicle interior. At this time, in this embodiment, the exterior heat exchanger 14 serves as a radiator to dissipate heat contained in the air into outside air. Even though a part of the cooled air by the interior evaporator 20 is heated again by the interior condenser 12, the temperature of the air can be sufficiently decreased to a level that can achieve the air cooling of the vehicle interior.

Next, the air heating mode will be described below. In the air heating mode, the air conditioning controller closes the liquid-phase inlet side opening/closing valve 16b, opens the gas-phase inlet side opening/closing valve 16a and the gas-phase outlet side opening/closing valve 16c, and completely opens the second expansion valve 19 with the first expansion valve 13 brought into a throttle state.

Thus, in the air heating mode, as indicated by solid arrows of FIG. 2, switching is performed to a refrigerant circuit for circulating the refrigerant through the compressor 11, the interior condenser 12, the first expansion valve 13, the exterior heat exchanger 14, the gas-phase inlet side opening/closing valve 16a, the accumulator 17, the gas-phase outlet side opening/closing valve 16c, and the compressor 11 in that order, while circulating the refrigerant through the accumulator 17, (second expansion valve 19), the interior evaporator 20, and the compressor 11 in that order.

With the above structure of the refrigerant circuit, the air conditioning controller determines the operating states of the respective various devices to be controlled connected to the output side of the air conditioning controller based on the target outlet temperature TAO and the detection signal from the sensor group.

For example, the refrigerant discharge capacity of the compressor 11, that is, the control signal to be output to the electric motor of the compressor 11 are determined in the following way. First, a target condenser temperature TCO of the interior condenser 12 is determined based on the target outlet temperature TAO with reference to the control map pre-stored in the air conditioning controller.

Then, a refrigerant discharge capacity of the compressor 11 is determined based on a deviation between the target condenser temperature TCO and the high-pressure side refrigerant temperature Td detected by the high-pressure side refrigerant temperature sensor such that the high-pressure side refrigerant temperature Td approaches the target condenser temperature TCO by using the feedback control method or the like.

An opening degree of the first expansion valve 13 is determined such that a supercooling degree of a refrigerant on the outlet side of the interior condenser 12 calculated based on the high-pressure side refrigerant temperature Td and a high-pressure side refrigerant pressure Pd detected by a high-pressure side refrigerant pressure sensor approaches the target supercooling degree KSC that is determined so as to substantially maximize a coefficient of performance (COP) of the cycle.

A control signal to be output to a servo motor of the air mix door 34 is determined such that the air temperature TAV detected by the air temperature sensor approaches the target outlet temperature TAO. In the air heating mode, as indicated by a solid line of FIG. 2, the opening degree of the air mix door 34 may be controlled such that the whole volume of air cooled by the cooler 32 passes through the interior condenser 12.

Figure 4:
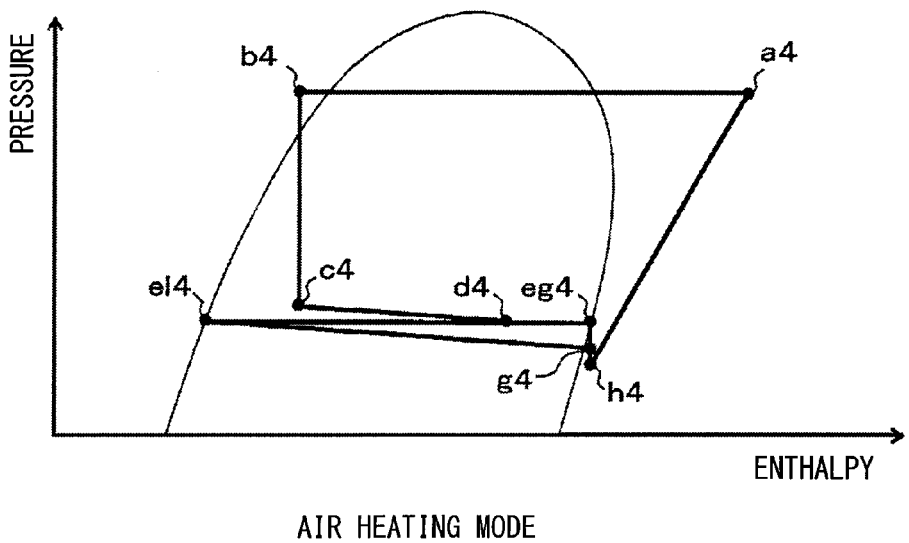
FIG. 4 is a Mollier chart showing the state of refrigerant in the air heating mode of the refrigeration cycle device in the first embodiment.

Thus, the refrigeration cycle device 10 in the air heating mode changes the state of the refrigerant as illustrated in a Mollier chart of FIG. 4. In FIG. 4, the state of the refrigerant in the same position of the refrigeration cycle device 10 as that in FIG. 3 is indicated using the same letter of the alphabet as that in FIG. 3. The same goes for the Mollier chart below.

Specifically, a high-pressure refrigerant discharged from the compressor 11 (as indicated at a point a4 in FIG. 4) flows into the interior condenser 12, and exchanges heat with the air to dissipate heat therefrom (as indicated from the point a4 to a point b4 in FIG. 4). In this way, a part of the air having passed through the interior evaporator 20 is heated.

Further, the refrigerant flowing out of the interior condenser 12 flows into the first expansion valve 13, and is then decompressed by the first expansion valve 13 into a low-pressure refrigerant (from the point "b4" to a point "c4" in FIG. 4). At this time, the opening degree of the first expansion valve 13 is adjusted such that the supercooling degree of the refrigerant on the outlet side of the exterior heat exchanger 14 (as indicated at the point b4 in FIG. 4) approaches the target supercooling degree KSC. In this way, the refrigeration cycle device 10 can achieve the high COP.

The low-pressure refrigerant decompressed by the first expansion valve 13 flows into the exterior heat exchanger 14 to absorb heat from the outside air blown from the blower fan to be evaporated itself (as indicated from the point c4 to a point d4 in FIG. 4). The refrigerant flowing out of the exterior heat exchanger 14 flows into the accumulator 17 to be separated into gas and liquid phases because the gas-phase inlet side opening/closing valve 16a is open (as indicated from the point d4 to a point eg4, and from the point d4 to a point e14 of FIG. 4).

The liquid-phase refrigerant separated by the accumulator 17 (as indicated at a point e14 of FIG. 4) flows out of the liquid-phase refrigerant outflow port of the accumulator 17 into the interior evaporator 20 via the second expansion valve 19. At this time, the second expansion valve 19 is fully opened, so that the refrigerant flowing from the liquid-phase refrigerant outflow port of the accumulator 17 flows into the interior evaporator 20, while being hardly decompressed.

The refrigerant flowing into the interior evaporator 20 absorbs heat from the air blown from the blower 32 to evaporate itself (as indicated from the point e14 to a point g4 in FIG. 4). In this way, the air is cooled. The refrigerant having flowed out of the interior evaporator 20 flows into the other one of the refrigerant inflow ports of the merging portion 15b.

In the air heating mode, the gas-phase outlet side opening/closing valve 16c is open, whereby the gas-phase refrigerant (as indicated at a point eg4 in FIG. 4) separated by the accumulator 17 flows into one of the refrigerant inflow ports of the merging portion 15b, and merges with the refrigerant flowing out of the interior evaporator 20. The refrigerant flowing out of the merging portion 15b is drawn into the compressor 11 and compressed again (as indicated from the point h4 to a point a4 in FIG. 4).

As mentioned above, in the air heating mode, the air cooled by the interior evaporator 20 is heated again in the interior condenser 12 to achieve the air-heating of the vehicle interior. At this time, in the air heating mode of this embodiment, the exterior heat exchanger 14 can serve as an evaporator to heat the air using heat absorbed from the outside air, achieving the air heating of the vehicle interior by sufficiently increasing the temperature of the air.

The vehicle air conditioner 1 of this embodiment can operate in the way described above, thereby achieving the air cooling and air heating of the vehicle interior.

In the refrigeration cycle device 10 of this embodiment, in the air cooling mode, the high-pressure refrigerant flowing from the interior condenser 12 flows into the accumulator 17 via the first expansion valve 13. Since the first expansion valve 13 is fully open, the high-pressure refrigerant is not decompressed. Thus, the refrigerant in the accumulator 17 can be relatively set to a high temperature. The air cooling of the vehicle interior (cooling of the air) is generally performed when an outside air temperature is high. In the cooling mode, the refrigerant in the accumulator 17 can be set to the relatively high temperature, thereby suppressing the increase in difference between the refrigerant temperature in the accumulator 17 disposed in the external space and the outside air temperature.

In the air heating mode, the refrigerant is decompressed by the first expansion valve 13 so as to have a lower pressure than that in the air cooling mode. The decompressed low-pressure refrigerant flows into the accumulator 17, so that the refrigerant in the accumulator 17 can be set to the relatively low temperature. The air heating of the vehicle interior (heating of the air) is generally performed when an outside air temperature is low. In the heating mode, the refrigerant in the accumulator 17 can be set to the relatively low temperature, thereby suppressing the increase in difference between the refrigerant temperature in the accumulator 17 disposed in the external space and the outside air temperature.

Thus, the refrigeration cycle device 10 of this embodiment can suppress the increase in difference between the temperature of the refrigerant in the accumulator 17 disposed in the external space and the outside air temperature even when switching to any operation mode.

In this embodiment, even in any operation mode, the refrigerant exchanging heat with the outside air in the exterior heat exchanger 14 flows into the accumulator 17, so that the refrigerant temperature in the accumulator 17 can be substantially equal to the outside air temperature. Therefore, the heat transfer hardly occurs between the outside air and the refrigerant in the accumulator 17 disposed in the external space in any operation mode.

That is, the refrigeration cycle device 10 of this embodiment can effectively suppress the degradation of performance of the refrigeration cycle device 10 due to unnecessary transfer of the heat between the outside air and the refrigerant in the accumulator 17 disposed in the external space even when switching to the refrigerant circuit in any operation mode.

In the air heating mode of this embodiment, the liquid-phase refrigerant separated by the accumulator 17 flows into the interior evaporator 20, so as to increase a difference in enthalpy between the refrigerant on the outlet side of the interior evaporator 20 and the refrigerant on the inlet side thereof, thereby increasing the refrigeration capacity exhibited by the interior evaporator 20. Thus, the present embodiment can improve the dehumidification performance in the dehumidification-air heating which involves dehumidifying the cooled air and heating the dehumidified air.

Second Embodiment

Figure 5:
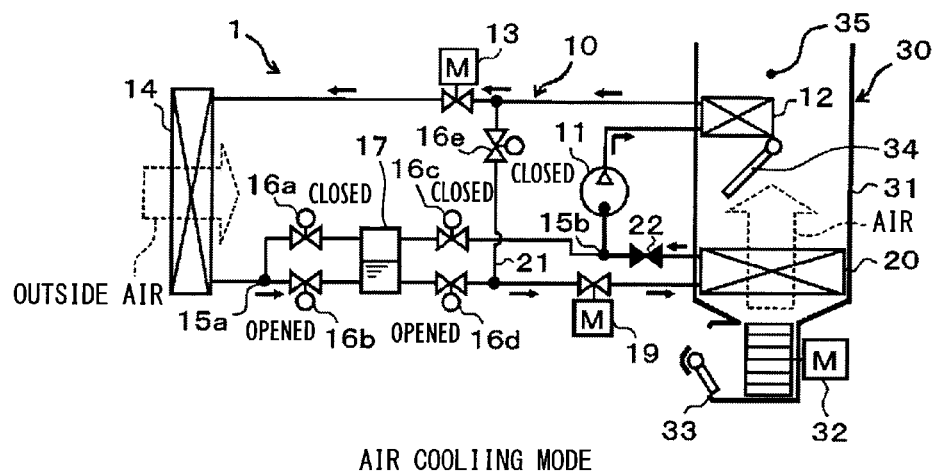
FIG. 5 is an entire configuration diagram showing a refrigerant circuit in an air cooling mode of a refrigeration cycle device according to a second embodiment.
Figure 6:
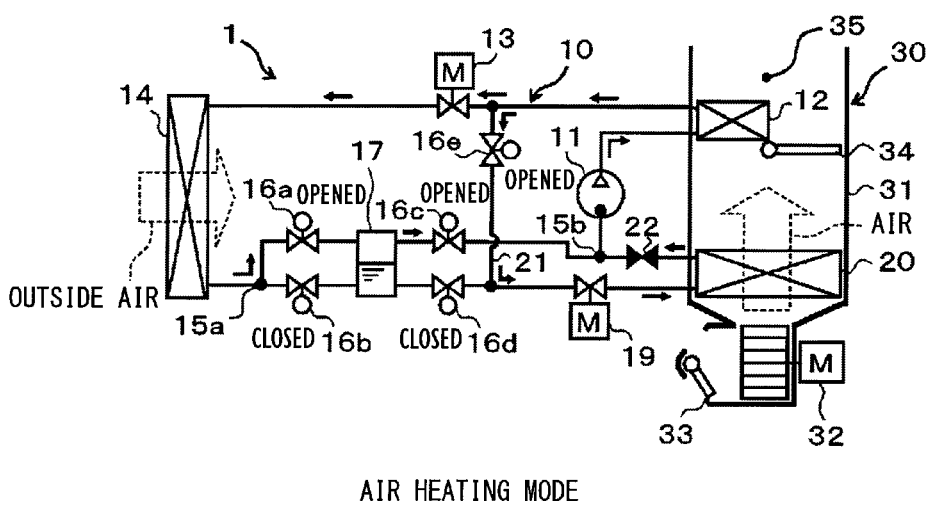
FIG. 6 is an entire configuration diagram showing a refrigerant circuit in an air heating mode of the refrigeration cycle device in the second embodiment.

In this embodiment, as shown in the entire configuration diagrams of FIGS. 5 and 6, a bypass passage 21, a fixed throttle 22, a liquid-phase outlet side opening/closing valve 16d, and a bypass passage opening/closing valve 16e are added to the refrigeration cycle device 10 of the first embodiment. Referring to FIGS. 5 and 6, the same or equivalent part as that in the first embodiment is designated by the same reference numeral. The same goes for the following figures.

Specifically, the bypass passage 21 of this embodiment is a refrigerant flow passage that guides the refrigerant flowing out of the interior condenser 12 to the inlet side of the second expansion valve 19 while bypassing the first expansion valve 13, the exterior heat exchanger 14, the accumulator 17, and the like. The bypass passage opening/closing valve 16e is an opening/closing valve for opening/closing the bypass passage 21. The liquid-phase outlet side opening/closing valve 16d is an opening/closing valve for opening/closing a refrigerant passage leading from the liquid-phase refrigerant outflow port of the accumulator 17 to a connection portion of the bypass passage 21.

The liquid-phase outlet side opening/closing valve 16d and the bypass passage opening/closing valve 16e each are an electromagnetic valve having the same structure as that of each of the opening/closing valves 16a to 16c described in the first embodiment, and constitute the refrigerant circuit switch together with the opening/closing valves 16a to 16c. Further, the bypass passage opening/closing valve 16e of this embodiment serves as a bypass passage opening/closing portion of the refrigerant circuit switch.

A fixed throttle 22 is disposed in a refrigerant passage leading from the refrigerant outlet side of the interior evaporator 20 to the other one of the refrigerant inlet sides of the merging portion 15b. The fixed throttle 22 can include an orifice, a capillary tube, and the like. The structures of other components are the same as those in the first embodiment.

Next, the operation of the above-mentioned structure according to this embodiment will be described below. First, in the air cooling mode, the air conditioning controller closes the gas-phase inlet side opening/closing valve 16a, the gas-phase outlet side opening/closing valve 16c, and the bypass passage opening/closing valve 16e, opens the liquid-phase inlet side opening/closing valve 16b and the liquid-phase outlet side opening/closing valve 16d, further completely opens the first expansion valve 13, and sets the second expansion valve 19 in a throttle state. The operations of other devices to be controlled are the same as those in the air cooling mode of the first embodiment.

Thus, in the air cooling mode of this embodiment, as indicated by solid arrows of FIG. 5, switching is performed to a refrigerant circuit that circulates a refrigerant through the compressor 11, the interior condenser 12, the first expansion valve 13, the exterior heat exchanger 14, the liquid-phase inlet side opening/closing valve 16b, the accumulator 17, the second expansion valve 19, the interior evaporator 20, the fixed throttle 22, and the compressor 11 in that order.

Figure 7:
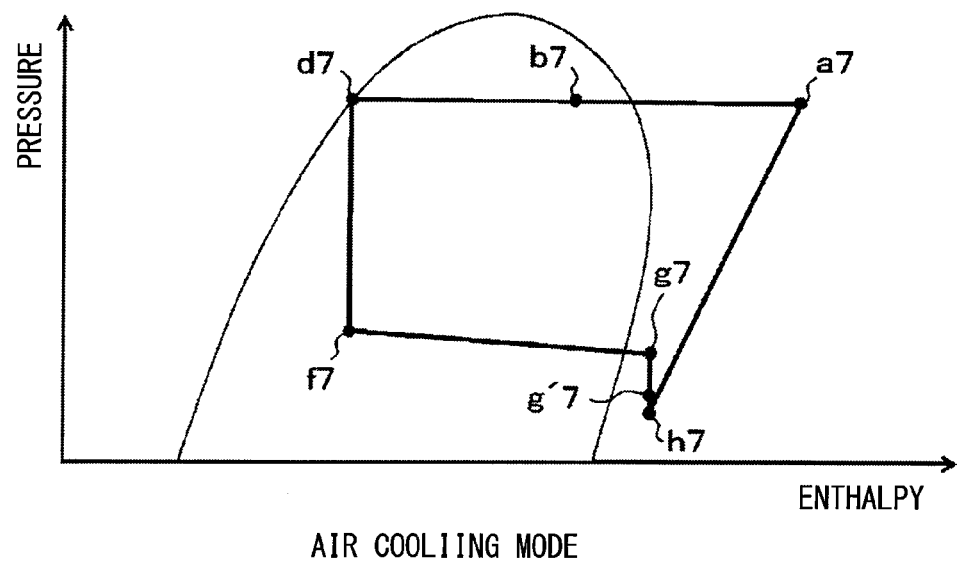
FIG. 7 is a Mollier chart showing the state of refrigerant in the air cooling mode of the refrigeration cycle device in the second embodiment.

Thus, the refrigeration cycle device 10 in the air cooling mode changes the state of the refrigerant as illustrated in a Mollier chart of FIG. 7. Specifically, a high-pressure refrigerant discharged from the compressor 11 (as indicated at a point a7 in FIG. 7) flows into the interior condenser 12, and exchanges heat with the air to dissipate heat therefrom (as indicated from the point a7 to a point b7 in FIG. 7), like the first embodiment. In this way, a part of the air having passed through the interior evaporator 20 is heated.

The refrigerant flowing out of the interior condenser 12 flows through the exterior heat exchanger 14, the accumulator 17, the second expansion valve 19, and the interior evaporator 20 in that order (in the order from the point a7 to the point b7, a point d7, and a point f7 in that order in FIG. 7), like the first embodiment. The refrigerant flowing into the interior evaporator 20 absorbs heat from the air blown from the blower 32 to evaporate itself (from the point f7 to a point g7 in FIG. 7). In this way, the air is cooled.

Then, the refrigerant flowing out of the interior evaporator 20 is decompressed by the fixed throttle 22 (as indicated from the point g7 to a point g'7 in FIG. 7), and drawn into the compressor 11 via the merging portion 15b to be compressed again (as indicated from a point h7 to the point a7 in FIG. 7). As mentioned above, in the air cooling mode of this embodiment, like the air cooling mode of the first embodiment, the air can be cooled by the interior evaporator 20, thereby achieving the air cooling of the vehicle interior.

On the other hand, in the air heating mode, the air conditioning controller closes the liquid-phase inlet side opening/closing valve 16b and the liquid-phase outlet side opening/closing valve 16d, opens the gas-phase inlet side opening/closing valve 16a, the gas-phase outlet side opening/closing valve 16c, and the bypass passage opening/closing valve 16e, and sets the first expansion valve 13 and the second expansion valve 19 in a throttle state. The operations of other devices to be controlled are the same as those in the air heating mode of the first embodiment.

More specifically, the opening degree of the second expansion valve 19 is determined such that the supercooling degree of the refrigerant on the outlet side of the interior condenser 12 approaches the target supercooling degree KSC. The opening degree of the first expansion valve 13 is determined such that the total of the amount of decompression of the refrigerant in the first expansion valve 13 and the amount of decompression of the refrigerant in the fixed throttle 22 is substantially equal to that in the second expansion valve 19. The operations of other devices to be controlled are the same as those in the air heating mode of the first embodiment.

Thus, in the air heating mode of this embodiment, as indicated by solid arrows of FIG. 6, switching is performed to a refrigerant circuit for circulating the refrigerant through the compressor 11, the interior condenser 12, the first expansion valve 13, the exterior heat exchanger 14, the gas-phase inlet side opening/closing valve 16a, the accumulator 17, the gas-phase outlet side opening/closing valve 16c, and the compressor 11 in that order, while circulating the refrigerant through the interior condenser 12, the bypass passage 21, the second expansion valve 19, the interior evaporator 20, the fixed throttle 22, and the compressor 11 in that order.

Figure 8:
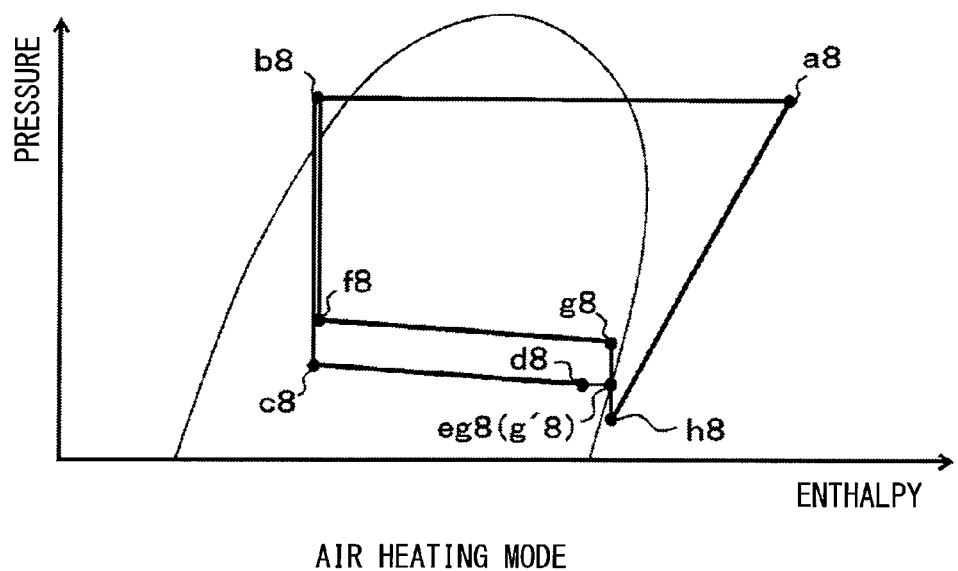
FIG. 8 is a Mollier chart showing the state of refrigerant in the air heating mode of the refrigeration cycle device in the second embodiment.

Thus, the refrigeration cycle device 10 in the air heating mode changes the state of the refrigerant as illustrated in a Mollier chart of FIG. 8. Specifically, a high-pressure refrigerant discharged from the compressor 11 (as indicated at a point a8 in FIG. 8) flows into the interior condenser 12, and exchanges heat with the air to dissipate heat therefrom (as indicated from the point a8 to a point b8 in FIG. 8), like the first embodiment. In this way, a part of the air having passed through the interior evaporator 20 is heated.

The flow of refrigerant flowing out of the interior condenser 12 is divided into a flow into the first expansion valve 13 and another flow into the second expansion valve 19 via the bypass passage 21 because the bypass passage opening/closing valve 16e is open. The refrigerant flowing into the first expansion valve 13 is decompressed to a pressure lower than that in the air cooling mode (as indicated from the point b8 to a point c8 in FIG. 8). The low-pressure refrigerant decompressed by the first expansion valve 13 flows into the exterior heat exchanger 14.

The refrigerant having flowed into the exterior heat exchanger 14 absorbs heat from the outside air blown from the blower fan to evaporate itself (as indicated from the point c8 to a point d8 in FIG. 8). The refrigerant flowing out of the exterior heat exchanger 14 flows into the accumulator 17 to be separated into gas and liquid phases because the gas-phase inlet side opening/closing valve 16a and the gas-phase outlet side opening/closing valve 16c are open. Then, the refrigerant flows out of the gas-phase refrigerant outflow port of the accumulator 17 into one of the refrigerant inflow ports of the merging portion 15b (as indicated from the point d8 to a point eg8 in FIG. 8).

On the other hand, the refrigerant flowing into the second expansion valve 19 via the bypass passage 21 is decompressed to a low-pressure refrigerant (as indicated form the point b8 to a point f8 in FIG. 8) to flow into the interior evaporator 20. The refrigerant flowing into the interior evaporator 20 absorbs heat from the air blown by the blower 32 to evaporate itself (from the point f8 to a point g8 in FIG. 8). In this way, the air is cooled.

The refrigerant flowing out of the interior evaporator 20 flows into the fixed throttle 22, and is decompressed to a pressure substantially equal to that of a gas-phase refrigerant flowing out of the accumulator 17 (as indicated from the point g8 to a point g'8 in FIG. 8). Then, the refrigerant decompressed by the fixed throttle 22 flows into the other one of the refrigerant inflow ports of the merging portion 15b, and is then merged with the refrigerant flowing out of the gas-phase refrigerant outflow port of the accumulator 17. The refrigerant flowing out of the merging portion 15b is drawn into the compressor 11 and compressed again (as indicated from a point h8 to the point a8 in FIG. 8).

As mentioned above, in the air heating mode, like the air heating mode of the first embodiment, the air cooled by the interior evaporator 20 is heated again in the interior condenser 12 to achieve the air-heating of the vehicle interior. Therefore, the vehicle air conditioner 1 of this embodiment can also achieve the air cooling and air heating of the vehicle interior.

In the refrigeration cycle device 10 of this embodiment, the refrigerant exchanging heat with the outside air in the exterior heat exchanger 14 flows into the accumulator 17 even in each of the air cooling mode and the air heating mode. That is, like the first embodiment, this embodiment can suppress the degradation of the performance of the refrigeration cycle device 10 due to the unnecessary transfer of heat between the outside air and the refrigerant in the accumulator 17.

In the air heating mode, the refrigeration cycle device 10 of this embodiment can perform switching to a refrigerant circuit for flowing the refrigerant from the interior condenser 12 to the exterior heat exchanger 14 and the interior evaporator 20 in parallel, allowing the refrigerant to be drawn into the compressor 11 because the bypass passage opening/closing valve 16e opens the bypass passage 21.

Thus, a refrigerant evaporation pressure (refrigerant evaporation temperature) in the exterior heat exchanger 14 can be set to a lower level than that in the interior heat exchanger 20 by the amount of decompression in the fixed throttle 22. As a result, in the air heating mode, the refrigerant evaporation temperature of the exterior heat exchanger 14 is sufficiently reduced, so that the refrigerant can sufficiently absorb heat for heating the space to be air-conditioned, from the outside air, and can increase the refrigerant evaporation temperature of the interior evaporator 20 up to the level that does not cause frost formation.

Although this embodiment has described the example in which the refrigerant evaporation temperature in the exterior heat exchanger 14 is lower than the refrigerant evaporation temperature in the interior evaporator 20, it is apparent that the refrigerant evaporation temperature in the exterior heat exchanger 14 may be set higher than that of the interior evaporator 20. In this case, the fixed throttle 22 may be disposed in a refrigerant passage leading from the outlet side of the gas-phase outlet side opening/closing valve 16c to one of the refrigerant inflows of the merging portion 15b.

Further, the fixed throttle 22 may be removed, and the refrigerant evaporation temperature in the exterior heat exchanger 14 may be equal to that in the interior evaporator 20.

Third Embodiment

Figure 9:
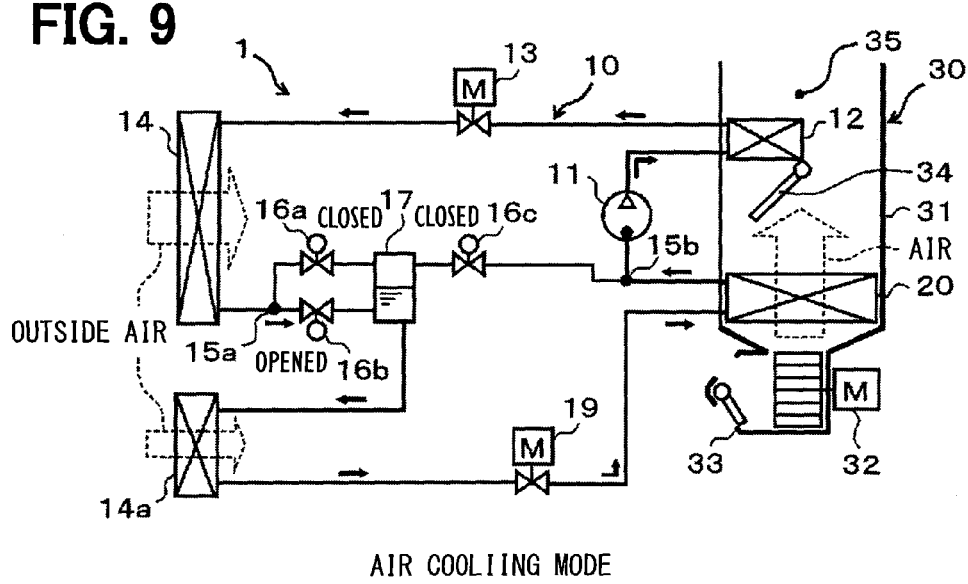
FIG. 9 is an entire configuration diagram showing a refrigerant circuit in an air cooling mode of a refrigeration cycle device according to a third embodiment.
Figure 10:
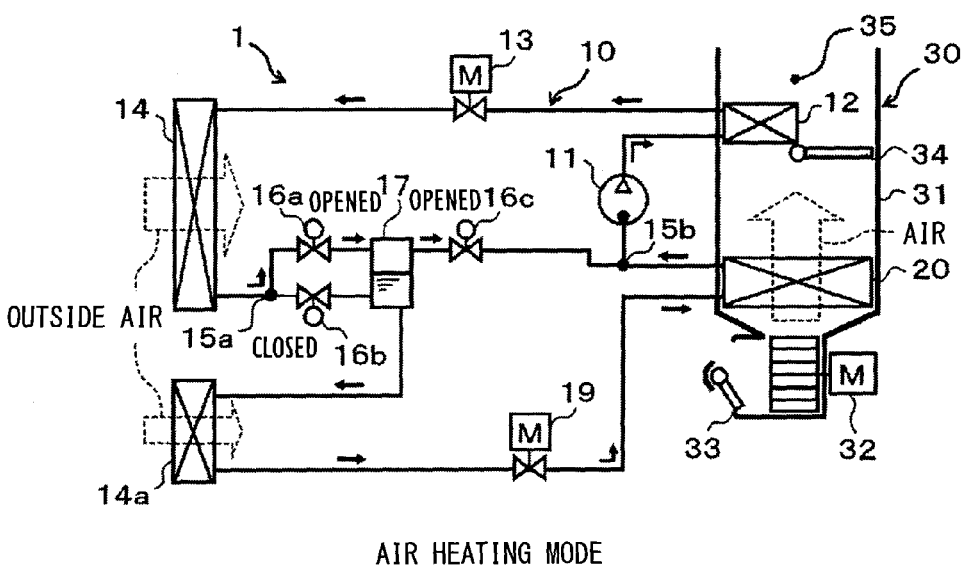
FIG. 10 is an entire configuration diagram showing a refrigerant circuit in an air heating mode of the refrigeration cycle device in the third embodiment.

This embodiment will describe an example in which an auxiliary exterior heat exchanger 14a for exchanging heat between the liquid-phase refrigerant separated by the accumulator 17 and the outside air is added to the refrigeration cycle device 10 of the first embodiment as shown in the entire configuration diagrams of FIGS. 9 and 10.

More specifically, the auxiliary exterior heat exchanger 14a of this embodiment is integrally formed with the exterior heat exchanger 14 to exchange heat between the refrigerant and the outside air blown from the common blower fan. It is apparent that the auxiliary exterior heat exchanger 14a may be formed of a different heat exchanger from the exterior heat exchanger 14. The refrigerant outlet side of the auxiliary exterior heat exchanger 14a is coupled to the inlet side of the second expansion valve 19. The structures of other components are the same as those in the first embodiment.

Next, the operation of the above-mentioned structure according to this embodiment will be described below. First, in the air cooling mode, the air conditioning controller closes the gas-phase inlet side opening/closing valve 16a and the gas-phase outlet side opening/closing valve 16c, opens the liquid-phase inlet side opening/closing valve 16b, further completely opens the first expansion valve 13, and sets the second expansion valve 19 in a throttle state. The operations of other devices to be controlled are the same as those in the air cooling mode of the first embodiment.

Thus, in the air cooling mode of this embodiment, as indicated by solid arrows of FIG. 9, switching is performed to a refrigerant circuit for circulation of a refrigerant through the compressor 11, the interior condenser 12, the first expansion valve 13, the exterior heat exchanger 14, the liquid-phase inlet side opening/closing valve 16b, the accumulator 17, the auxiliary exterior heat exchanger 14a, the second expansion valve 19, the interior evaporator 20, and the compressor 11 in that order.

Figure 11:
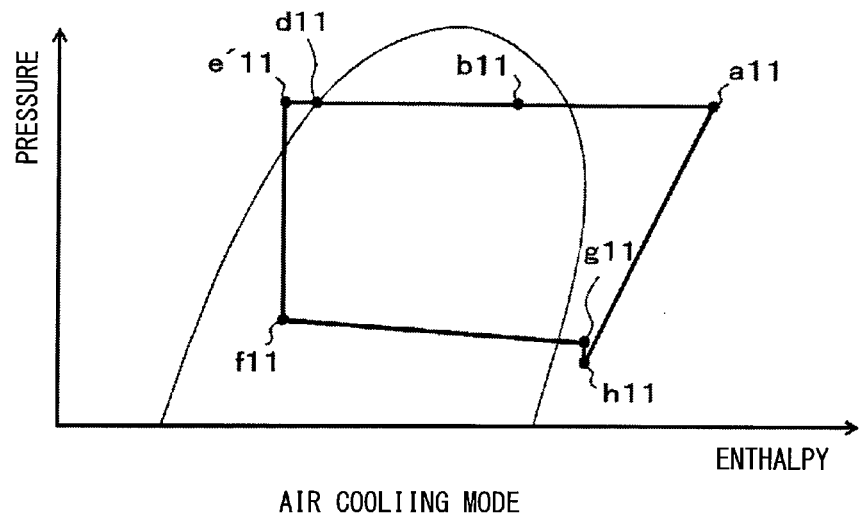
FIG. 11 is a Mollier chart showing the state of refrigerant in the air cooling mode of the refrigeration cycle device in the third embodiment.

Thus, the refrigeration cycle device 10 in the air cooling mode changes the state of the refrigerant as illustrated in a Mollier chart of FIG. 11. Specifically, a high-pressure refrigerant discharged from the compressor 11 (as indicated at a point a11 in FIG. 11) flows into the interior condenser 12, and exchanges heat with the air to dissipate heat therefrom (as indicated from the point a11 to a point b11 in FIG. 11), like the first embodiment. In this way, a part of the air having passed through the interior evaporator 20 is heated.

The refrigerant flowing from the interior condenser 12 flows into the exterior heat exchanger 14 to exchange heat with the outside air, thereby decreasing the enthalpy (as indicated from the point b11 to a point d11 in FIG. 11). The refrigerant flowing out of the exterior heat exchanger 14 flows into the accumulator 17 to be separated into gas and liquid phases because the liquid-phase inlet side opening/closing valve 16b is open.

The liquid-phase refrigerant separated by the accumulator 17 flows out of the liquid-phase refrigerant outflow port of the accumulator 17 into the auxiliary exterior heat exchanger 14a. Then, the refrigerant exchanges heat with the outside air in the auxiliary exterior heat exchanger 14a, thereby decreasing the enthalpy to be brought into a supercooled state (as indicated from the point d11 to a point e'11 of FIG. 11).

The refrigerant flowing out of the auxiliary exterior heat exchanger 14a flows into the second expansion valve 19, and is then decompressed to a low-pressure refrigerant (as indicated from the point e'11 to a point f11 in FIG. 11). The operations following the step are the same as those in the first embodiment. As mentioned above, in the air cooling mode of this embodiment, the air can be cooled by the interior evaporator 20, thereby achieving the air cooling of the vehicle interior.

Next, the air heating mode will be described below. In the air heating mode, the air conditioning controller closes the liquid-phase inlet side opening/closing valve 16b, opens the gas-phase inlet side opening/closing valve 16a and the gas-phase outlet side opening/closing valve 16c, and further completely opens the second expansion valve 19 with the first expansion valve 13 brought into a throttle state. The operations of other devices to be controlled are the same as those in the air heating mode of the first embodiment.

Thus, in the air heating mode of this embodiment, as indicated by solid arrows of FIG. 10, switching is performed to a refrigerant circuit for circulating the refrigerant through the compressor 11, the interior condenser 12, the first expansion valve 13, the exterior heat exchanger 14, the gas-phase inlet side opening/closing valve 16a, the accumulator 17, the gas-phase outlet side opening/closing valve 16c, and the compressor 11 in that order, while circulating the refrigerant through the accumulator 17, the auxiliary heat exchanger 14a, (the second expansion valve 19), the interior evaporator 20, and the compressor 11 in that order.

Figure 12:
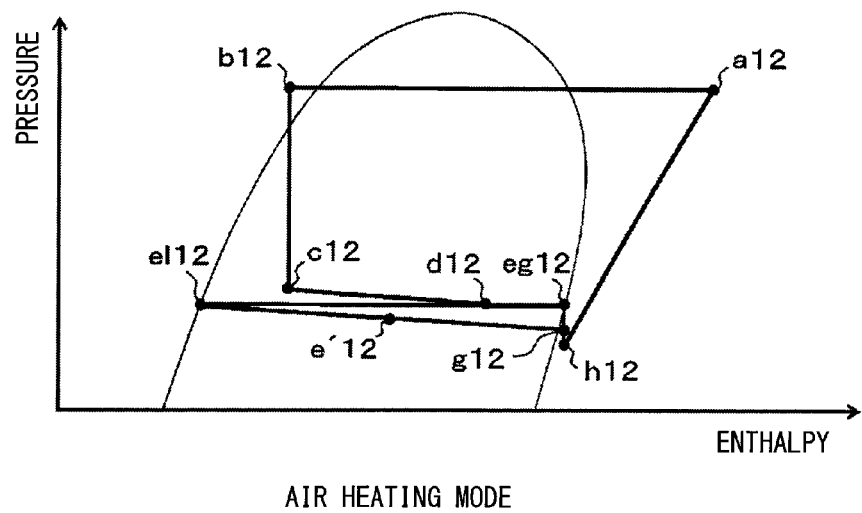
FIG. 12 is a Mollier chart showing the state of refrigerant in the air heating mode of the refrigeration cycle device in the third embodiment.

Thus, the refrigeration cycle device 10 in the air heating mode changes the state of the refrigerant as illustrated in a Mollier chart of FIG. 12. Specifically, a high-pressure refrigerant discharged from the compressor 11 (as indicated at a point a12 in FIG. 12) flows into the interior condenser 12, and exchanges heat with the air to dissipate heat therefrom (as indicated from the point a12 to a point b12 in FIG. 12), like the first embodiment. Thus, a part of the air having passed through the interior evaporator 20 is heated.

The refrigerant flowing out of the interior condenser 12 flows through the first expansion valve 13 and the exterior heat exchanger 14 in that order, like the first embodiment, (as indicated at points b12, c12, and d12 in FIG. 12), and is separated into liquid and gas phases by the accumulator 17 (as indicated from the point d12 to a point eg12, and from the point d12 to a point el12 in FIG. 12). The refrigerant is decompressed by the first expansion valve 13 to have a lower pressure than that in the cooling mode. The liquid-phase refrigerant separated by the accumulator 17 (at the point el12 of FIG. 12) flows out of the liquid-phase refrigerant outflow port of the accumulator 17 into the auxiliary exterior heat exchanger 14a.

The refrigerant having flowed into the auxiliary exterior heat exchanger 14a absorbs heat from the outside air blown from the blower fan to evaporate itself (as indicated from the point el12 to a point e'12 in FIG. 12). The refrigerant flowing out of the auxiliary exterior heat exchanger 14a flows into the interior evaporator 20 via the second expansion valve 19. At this time, the second expansion valve 19 is fully open, so that the refrigerant flowing out of the liquid-phase refrigerant outflow port of the accumulator 17 flows into the interior evaporator 20 while being hardly decompressed.

The operations following the step are the same as those in the first embodiment. Thus, also in the air heating mode of this embodiment, the air cooled by the interior evaporator 20 is heated again in the interior condenser 12 to achieve the air-heating of the vehicle interior.

Further, the refrigeration cycle device 10 of this embodiment can effectively suppress the degradation of the refrigeration cycle device 10 due to unnecessary transfer of the heat between the outside air and the refrigerant in the accumulator 17 disposed in the external space even when switching to either of the air cooling mode and the air heating mode, like the first embodiment.

In the air cooling mode, the refrigeration cycle device 10 of this embodiment causes the auxiliary exterior heat exchanger 14a to serve as a supercooling heat exchanger, so as to increase a difference in enthalpy between the refrigerant on the outlet side of the interior evaporator 20 and the refrigerant on the inlet side thereof, thus increasing the refrigeration capacity exhibited by the interior evaporator 20. In the air heating mode, the auxiliary exterior heat exchanger 14a can serve as an evaporator for absorbing heat in the refrigerant from the outside air, thereby improving the heating capacity of air by the interior condenser 12.

Fourth Embodiment

Figure 13:
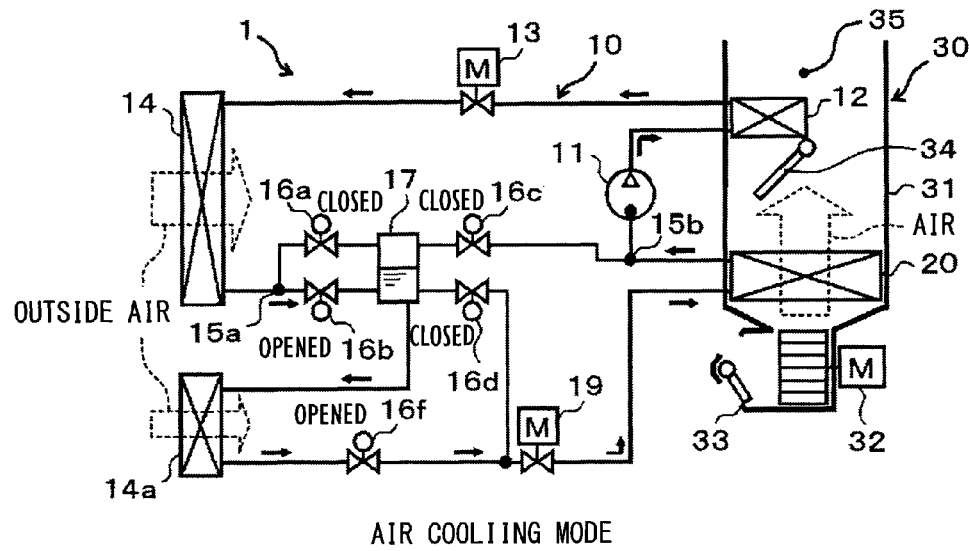
FIG. 13 is an entire configuration diagram showing a refrigerant circuit in an air cooling mode of a refrigeration cycle device according to a fourth embodiment.
Figure 14:
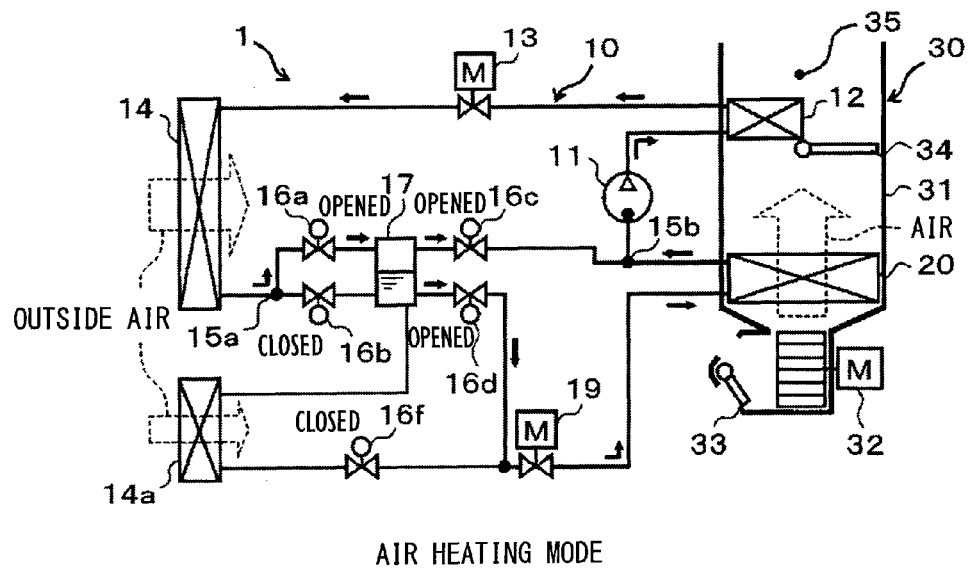
FIG. 14 is an entire configuration diagram showing a refrigerant circuit in an air heating mode of the refrigeration cycle device in the fourth embodiment.

This embodiment will describe an example in which a liquid-phase outlet side opening/closing valve 16d and an exterior unit side opening/closing valve 16f are added to the refrigeration cycle device 10 of the third embodiment as shown in the entire configuration diagrams of FIGS. 13 and 14. More specifically, the liquid-phase outlet side opening/closing valve 16d of this embodiment is disposed in a refrigerant passage connecting between the liquid-phase refrigerant outflow port of the accumulator 17 and the inlet side of the second expansion valve 19.

Further, the exterior unit side opening/closing valve 16f is disposed in a refrigerant passage leading from the refrigerant outlet side of the auxiliary exterior heat exchanger 14a to the inlet side of the second expansion valve 19, and serves to open and close the refrigerant passage. Note that the exterior unit side opening/closing valve 16f is an electromagnetic valve having the same structure as that of each of the opening/closing valves 16a to 16d described in the above-mentioned embodiments, and serves as the refrigerant circuit switch of this embodiment. The structures of other components are the same as those in the third embodiment.

Next, the operation of the above-mentioned structure according to this embodiment will be described below. First, in the air cooling mode, the air conditioning controller closes the gas-phase inlet side opening/closing valve 16a, the gas-phase outlet side opening/closing valve 16c, and the liquid-phase outlet side opening/closing valve 16d, opens the liquid-phase inlet side opening/closing valve 16b and the exterior unit side opening/closing valve 16f, completely opens the first expansion valve 13, and sets the second expansion valve 19 in a throttle state. The operations of other devices to be controlled are the same as those in the air cooling mode of the third embodiment.

Thus, in the air cooling mode of this embodiment, as indicated by solid arrows in FIG. 13, the same refrigerant circuit as that in the air cooling mode of the third embodiment can be configured to achieve the air cooling of the vehicle interior in the same manner as that in the air cooling mode of the third embodiment.

On the other hand, in the air heating mode, the air conditioning controller closes the liquid-phase inlet side opening/closing valve 16b and the exterior unit side opening/closing valve 16f, opens the gas-phase inlet side opening/closing valve 16a, the gas-phase outlet side opening/closing valve 16c, and the liquid-phase outlet side opening/closing valve 16d, sets the first expansion valve 13 in a throttle state, and fully opens the second expansion valve 19. The operations of other devices to be controlled are the same as those in the air heating mode of the third embodiment.

Thus, in the air heating mode of this embodiment, as indicated by solid arrows of FIG. 14, the same refrigerant circuit as that in the air heating mode of the first embodiment can be configured without letting the liquid-phase refrigerant separated by the accumulator 17 to flow out toward the auxiliary exterior heat exchanger 14a. As a result, the air heating of the vehicle interior can be achieved in the same way as that in the air heating mode of the first embodiment.

As mentioned above, the refrigeration cycle device 10 of this embodiment can suppress the degradation of the performance of the refrigeration cycle device 10 due to unnecessary transfer of the heat between the outside air and the refrigerant in the accumulator 17 in any one of the air cooling mode and the air heating mode, like the first embodiment.

Fifth Embodiment

Figure 15:
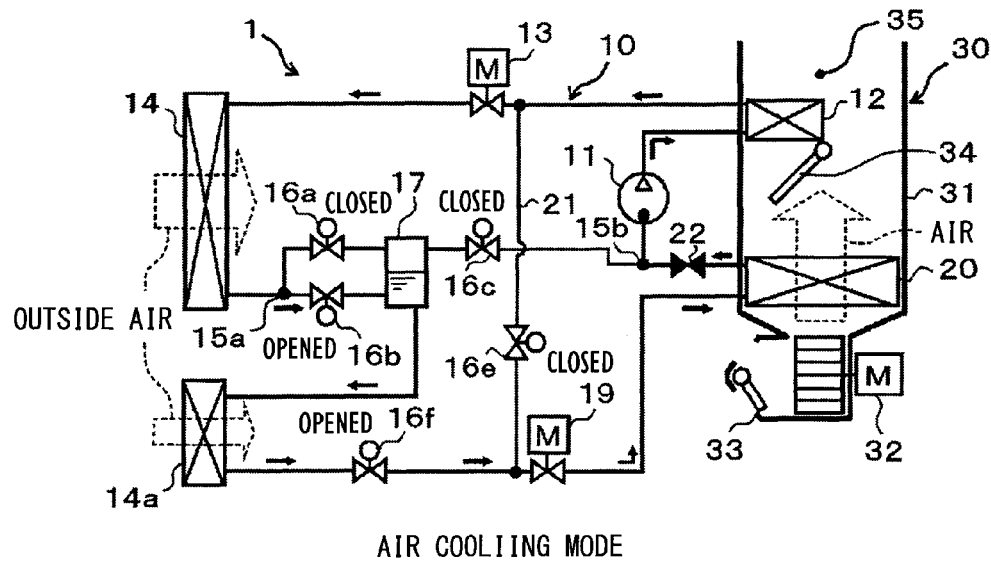
FIG. 15 is an entire configuration diagram showing a refrigerant circuit in an air cooling mode of a refrigeration cycle device according to a fifth embodiment.
Figure 16:
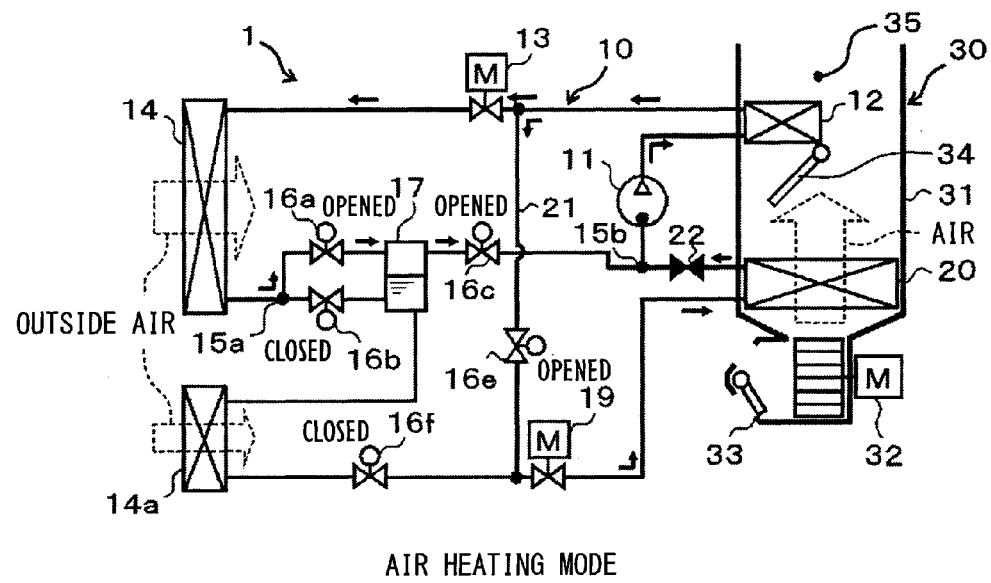
FIG. 16 is an entire configuration diagram showing a refrigerant circuit in an air heating mode of the refrigeration cycle device in the fifth embodiment.

This embodiment will describe an example in which the same bypass passage 21, bypass passage opening/closing valve 16e, and fixed throttle 22 as those in the second embodiment, and the same exterior unit side opening/closing valve 16f as that of the fourth embodiment are added to the refrigeration cycle device 10 of the third embodiment as shown in the entire configuration diagrams of FIGS. 15 and 16.

Specifically, the bypass passage 21 of this embodiment is a refrigerant passage that guides the refrigerant flowing out of the interior condenser 12 to the inlet side of the second expansion valve 19 while bypassing the first expansion valve 13, the exterior heat exchanger 14, the accumulator 17, the auxiliary exterior heat exchanger 14a, and the like. The structures of other components are the same as those in the third embodiment.

Next, the operation of the above-mentioned structure according to this embodiment will be described below. First, in the air cooling mode, the air conditioning controller closes the gas-phase inlet side opening/closing valve 16a, the gas-phase outlet side opening/closing valve 16c, and the bypass passage opening/closing valve 16e, opens the liquid-phase inlet side opening/closing valve 16b and the exterior unit side opening/closing valve 16f, completely opens the first expansion valve 13, and sets the second expansion valve 19 in a throttle state. The operations of other devices to be controlled are the same as those in the air cooling mode of the third embodiment.

Thus, in the air cooling mode of this embodiment, as indicated by solid arrows of FIG. 15, switching is performed to a refrigerant circuit that circulates a refrigerant through the compressor 11, the interior condenser 12, the first expansion valve 13, the exterior heat exchanger 14, the liquid-phase inlet side opening/closing valve 16b, the accumulator 17, the auxiliary exterior heat exchanger 14a, the exterior unit side opening/closing valve 16f, the second expansion valve 19, the interior evaporator 20, the fixed throttle 22, and the compressor 11 in that order.

Thus, in the air cooling mode of this embodiment, the refrigerant flowing out of the interior evaporator 20 is decompressed by the fixed throttle 22 and drawn into the compressor 11, thereby achieving the air cooling of the vehicle interior in the substantially same way as the air cooling mode of the third embodiment.

On the other hand, in the air heating mode, the air conditioning controller closes the liquid-phase inlet side opening/closing valve 16b and the exterior unit side opening/closing valve 16f, opens the gas-phase inlet side opening/closing valve 16a, the gas-phase outlet side opening/closing valve 16c, and the bypass passage opening/closing valve 16e, and sets the first expansion valve 13 and the second expansion valve 19 in the throttle state. The refrigerant is decompressed by the first expansion valve 13 to have a lower pressure than that in the cooling mode. The operations of other devices to be controlled are the same as those in the air heating mode of the third embodiment.

Thus, in the air heating mode of this embodiment, as indicated by solid arrows of FIG. 16, the same refrigerant circuit as that in the air heating mode of the second embodiment can be configured without letting the liquid-phase refrigerant separated by the accumulator 17 to flow out toward the auxiliary exterior heat exchanger 14a, thereby achieving the air heating of the vehicle interior in the same way as in the air heating mode of the second embodiment.

As mentioned above, the refrigeration cycle device 10 of this embodiment can suppress the degradation of the performance of the refrigeration cycle device 10 due to unnecessary transfer of the heat between the outside air and the refrigerant in the accumulator 17 in any one of the air cooling mode and the air heating mode, like the first embodiment.

Like the second embodiment, the refrigeration cycle device 10 of this embodiment can make a temperature range of the refrigerant evaporation temperature in the exterior heat exchanger 14 different from that of the refrigerant evaporation temperature in the interior evaporator 20.

Sixth Embodiment

Figure 17:
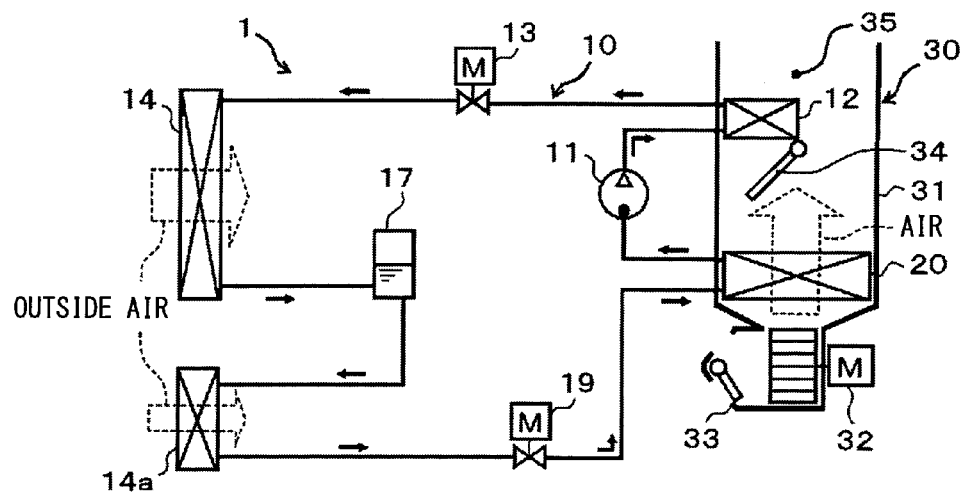
FIG. 17 is an entire configuration diagram of a refrigeration cycle device according to a sixth embodiment.

This embodiment will describe an example in which the respective opening/closing valves 16a to 16c, the branch portion 15a, and the merging portion 15b are removed and further the gas-phase side inflow port and gas-phase refrigerant outflow port of the accumulator 17 are removed from the refrigeration cycle device 10 of the third embodiment as shown in the entire configuration diagram of FIG. 17.

In the air cooling mode of this embodiment, the air conditioning controller fully opens the first expansion valve 13, and sets the second expansion valve 19 in the throttle state. The operations of other devices to be controlled are the same as those in the air cooling mode of the third embodiment. Thus, in the air cooling mode of this embodiment, the same refrigerant circuit as that in the air cooling mode of the third embodiment can be configured to achieve the air cooling of the vehicle interior in the same manner as that in the air cooling mode of the third embodiment.

In the air heating mode of this embodiment, the air conditioning controller fully opens the second expansion valve 19 with the first expansion valve 13 set in the throttle state. The operations of other devices to be controlled are the same as those in the air heating mode of the third embodiment. Thus, the refrigeration cycle device 10 in the air heating mode changes the state of the refrigerant as illustrated in a Mollier chart of FIG. 18.

Specifically, a high-pressure refrigerant discharged from the compressor 11 (as indicated at a point a18 in FIG. 18) flows into the interior condenser 12, and exchanges heat with the air to dissipate heat therefrom (as indicated from the point a18 to a point b18 in FIG. 18), like the first embodiment. In this way, a part of the air having passed through the interior evaporator 20 is heated. The refrigerant flowing from the interior condenser 12 flows into the first expansion valve 13, and is then decompressed by the first expansion valve 13 into a low-pressure refrigerant whose pressure is lower than that in the air cooling mode (as indicated from the point b18 to a point c18 in FIG. 18).

Figure 18:
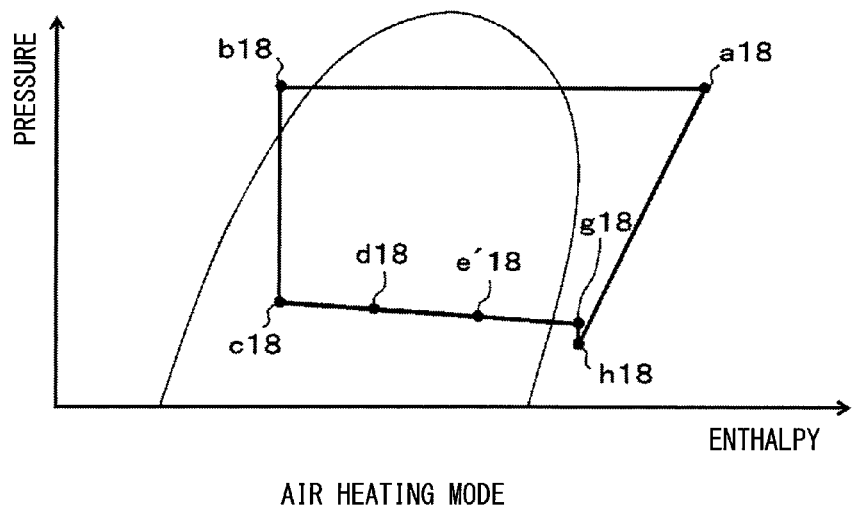
FIG. 18 is a Mollier chart showing the state of refrigerant in an air heating mode of the refrigeration cycle device in the sixth embodiment.

The refrigerant decompressed by the first expansion valve 13 flows through the exterior heat exchanger 14, (the accumulator 17), and the auxiliary exterior heat exchanger 14a in that order, and absorbs heat from the outside air to increase the enthalpy (as indicated at the point c18, a point d18, and a point e'18 in that order in FIG. 18). The refrigerant flowing out of the auxiliary exterior heat exchanger 14a flows into the interior evaporator 20 via the second expansion valve 19.

At this time, the second expansion valve 19 is fully open, so that the refrigerant flowing out of the liquid-phase refrigerant outflow port of the accumulator 17 flows into the interior evaporator 20 while being hardly decompressed. The operations following this step will be the same as those in the air cooling mode. Thus, in the air heating mode of this embodiment, the air cooled by the interior evaporator 20 is heated again in the interior condenser 12, so as to achieve the air heating of the vehicle interior.

As mentioned above, the refrigeration cycle device 10 of this embodiment can suppress the degradation of the performance of the refrigeration cycle device 10 due to unnecessary transfer of the heat between the outside air and the refrigerant in the accumulator 17 in the air cooling mode, like the third embodiment.

In the air heating mode, the refrigerant is not retained in the accumulator 17, and the accumulator 17 simply serves as a refrigerant passage, and thereby it can suppress the degradation of the performance of the refrigeration cycle device 10 due to unnecessary transfer of the heat between the outside air and the refrigerant in the accumulator 17.

Seventh Embodiment

Figure 19:
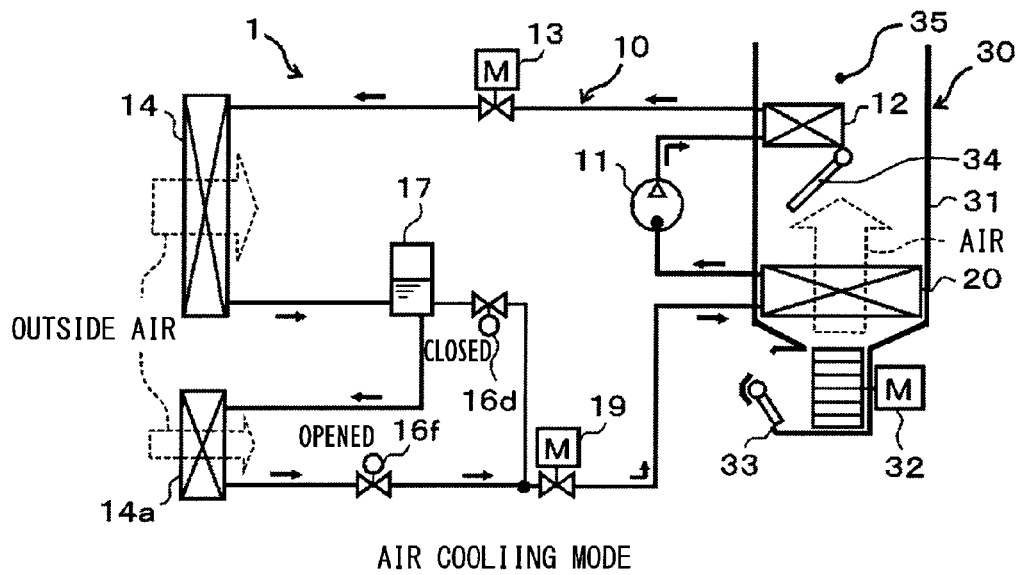
FIG. 19 is an entire configuration diagram showing a refrigerant circuit in an air cooling mode of a refrigeration cycle device according to a seventh embodiment.
Figure 20:
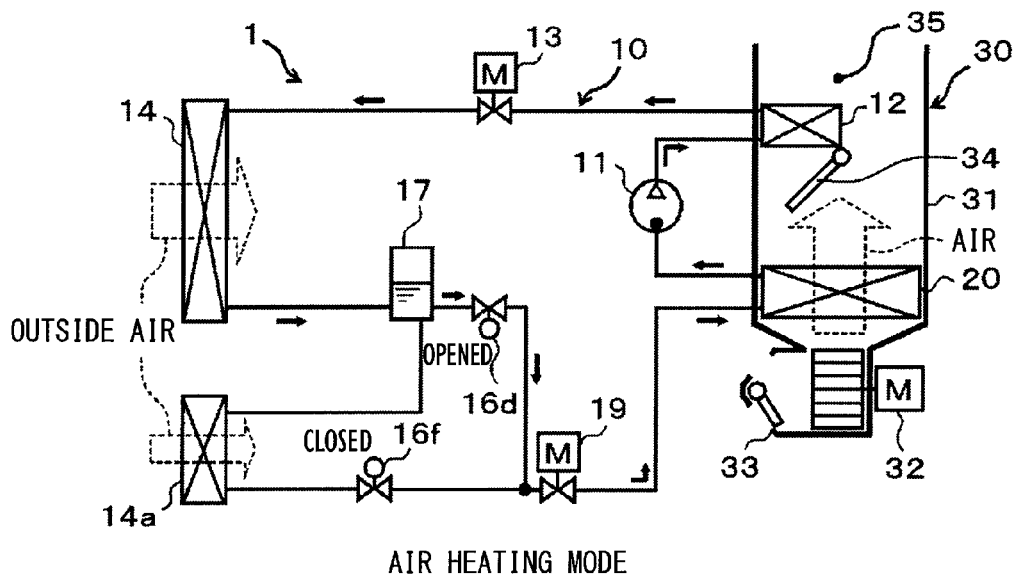
FIG. 20 is an entire configuration diagram showing a refrigerant circuit in an air heating mode of the refrigeration cycle device in the seventh embodiment.

This embodiment will describe an example in which the liquid-phase outlet side opening/closing valve 16d and the exterior unit side opening/closing valve 16f, which are the same as those in the fourth embodiment, are added to the refrigeration cycle device 10 of the sixth embodiment as shown in the entire configuration diagrams of FIGS. 19 and 20.

In the air cooling mode of this embodiment, the air conditioning controller closes the liquid-phase outlet side opening/closing valve 16d, opens the exterior unit side opening/closing valve 16f, further completely opens the first expansion valve 13, and sets the second expansion valve 19 in a throttle state. The operations of other devices to be controlled are the same as those in the air cooling mode of the sixth embodiment.

Thus, in the air cooling mode of this embodiment, as indicated by solid arrows in FIG. 19, the same refrigerant circuit as that in the air cooling mode of the sixth embodiment can be configured to achieve the air cooling of the vehicle interior in the same manner as that in the air cooling mode of the sixth embodiment.

In the air heating mode of this embodiment, the air conditioning controller closes the exterior unit side opening/closing valve 16f, opens the liquid-phase outlet side opening/closing valve 16d, sets the first expansion valve 13 in the throttle state, and fully opens the second expansion valve 19. The operations of other devices to be controlled are the same as those in the air heating mode of the sixth embodiment.

Thus, in the air heating mode of this embodiment, as indicated by solid arrows of FIG. 20, switching is performed to a refrigerant circuit that circulates a refrigerant through the compressor 11, the interior condenser 12, the first expansion valve 13, the exterior heat exchanger 14, the accumulator 17, the liquid-phase outlet side opening/closing valve 16d, (second expansion valve 19), the interior evaporator 20, and the compressor 11 in that order.

Figure 21:
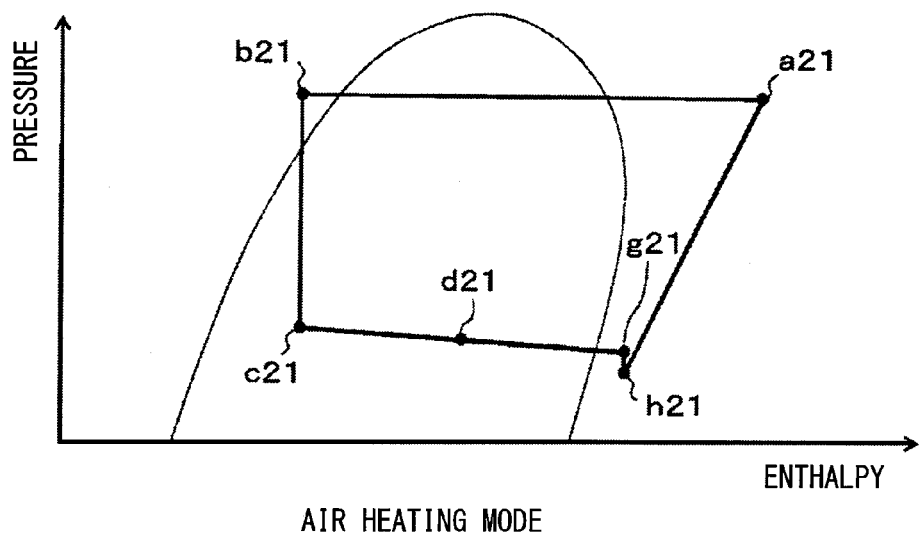
FIG. 21 is a Mollier chart showing the state of refrigerant in the air heating mode of the refrigeration cycle device in the seventh embodiment.

Thus, the refrigeration cycle device 10 in the air heating mode changes the state of the refrigerant as illustrated in a Mollier chart of FIG. 21. Specifically, a high-pressure refrigerant discharged from the compressor 11 (as indicated at a point a21 in FIG. 21) flows into the interior condenser 21, and exchanges heat with the air to dissipate heat therefrom (as indicated from the point a21 to a point b21 in FIG. 21), like the sixth embodiment.

In this way, a part of the air having passed through the interior evaporator 20 is heated. The refrigerant flowing out of the interior condenser 12 flows through the first expansion valve 13 and the exterior heat exchanger 14 in that order (as indicated from the point b21 to a point c21 and a point d21 in that order in FIG. 21). Since the exterior unit side opening/closing valve 16f is closed and the liquid-phase outlet side opening/closing valve 16d is opened, the refrigerant flowing from the exterior heat exchanger 14 flows into the interior evaporator 20 via the accumulator 17 and the second expansion valve 19.

At this time, the second expansion valve 19 is fully open, so that the refrigerant flowing out of the liquid-phase refrigerant outflow port of the accumulator 17 flows into the interior evaporator 20 while being hardly decompressed. The operations following this step will be the same as those in the air cooling mode. Thus, in the air heating mode of this embodiment, the air cooled by the interior evaporator 20 is heated again in the interior condenser 12, so as to achieve the air heating of the vehicle interior.

As mentioned above, the refrigeration cycle device 10 of this embodiment can suppress the degradation of the performance of the refrigeration cycle device 10 due to unnecessary transfer of the heat between the outside air and the refrigerant in the accumulator 17 in the air cooling mode, like the sixth embodiment.

In the air heating mode, the refrigerant is not retained in the accumulator 17, and the accumulator 17 simply serves as a refrigerant passage, thereby suppressing the degradation of the performance of the refrigeration cycle device 10 due to unnecessary transfer of the heat between the outside air and the refrigerant in the accumulator 17.

Eighth Embodiment

Figure 22:
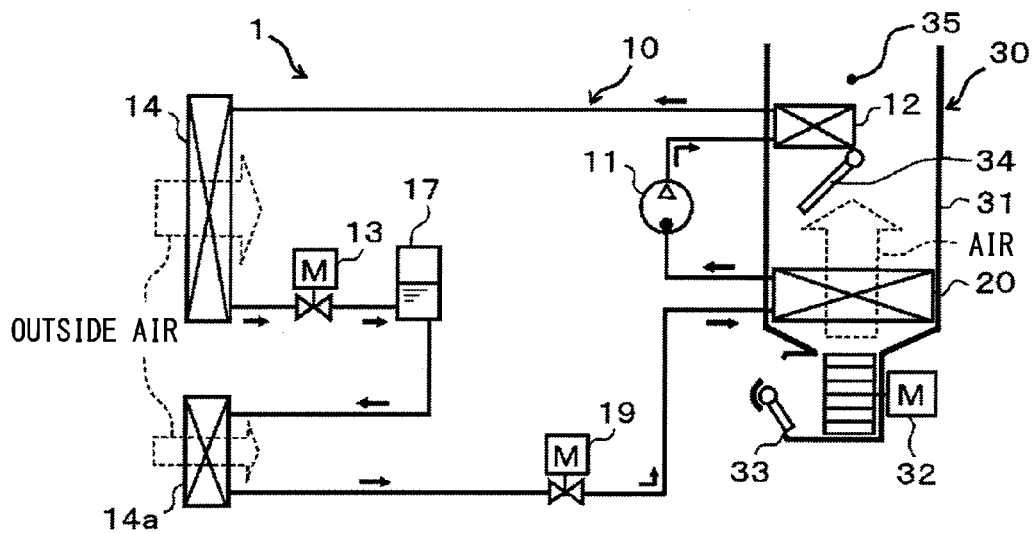
FIG. 22 is an entire configuration diagram of a refrigeration cycle device according to an eighth embodiment.

This embodiment will describe an example in which the arrangement of the first expansion valve 13 is changed with respect to the refrigeration cycle device 10 of the sixth embodiment, as shown in the entire configuration diagram of FIG. 22. Specifically, the first expansion valve 13 of this embodiment is disposed in a refrigerant passage leading from the refrigerant outlet of the exterior heat exchanger 14 to the liquid-phase side inflow port of the accumulator 17. The structures of other components are the same as those in the sixth embodiment.

In the air cooling mode of this embodiment, the air conditioning controller fully opens the first expansion valve 13, and sets the second expansion valve 19 in the throttle state. The operations of other devices to be controlled are the same as those in the air cooling mode of the sixth embodiment. Thus, in the air cooling mode of this embodiment, the same refrigerant circuit as that in the air cooling mode of the sixth embodiment can be configured to achieve the air cooling of the vehicle interior in the same manner as that in the air cooling mode of the sixth embodiment.

In the air heating mode of this embodiment, the air conditioning controller fully opens the second expansion valve 19 with the first expansion valve 13 set in the throttle state. The operations of other devices to be controlled are the same as those in the air heating mode of the sixth embodiment.

Figure 23:
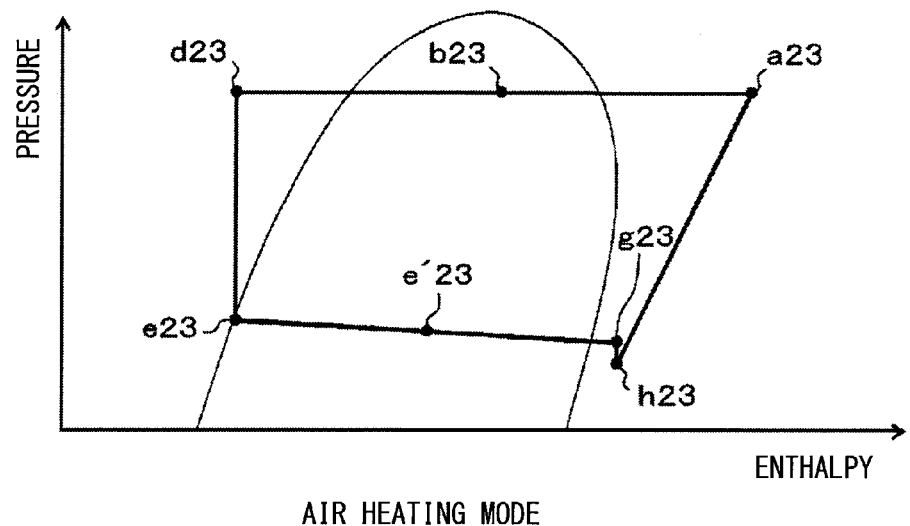
FIG. 23 is a Mollier chart showing the state of refrigerant in an air heating mode of the refrigeration cycle device in the eighth embodiment.

Thus, the refrigeration cycle device 10 in the air heating mode changes the state of the refrigerant as illustrated in a Mollier chart of FIG. 23. Specifically, a high-pressure refrigerant discharged from the compressor 11 (as indicated at a point a23 in FIG. 23) flows into the interior condenser 12, and exchanges heat with the air to dissipate heat therefrom (as indicated from the point a23 to a point b23 in FIG. 23). In this way, a part of the air having passed through the interior evaporator 20 is heated.

The refrigerant flowing from the interior condenser 12 flows into the exterior heat exchanger 14 to exchange heat with the outside air, thereby decreasing the enthalpy (as indicated from the point b23 to a point d23 in FIG. 23). The refrigerant flowing out of the exterior heat exchanger 14 flows into the first expansion valve 13, and is then decompressed to a low-pressure refrigerant (as indicated from the point d23 to a point e23 in FIG. 23).

The refrigerant decompressed by the first expansion valve 13 to a lower pressure than that in the air cooling mode flows into the auxiliary exterior heat exchanger 14a, and absorbs heat from the outside air to increase the enthalpy (as indicated from the point e23 to a point e'23 in FIG. 23). The refrigerant flowing out of the auxiliary exterior heat exchanger 14a flows into the interior evaporator 20 via the second expansion valve 19. At this time, the second expansion valve 19 is fully opened, so that the refrigerant flowing from the auxiliary exterior heat exchanger 14a flows into the interior evaporator 20 while being hardly decompressed.

The operations following this step will be the same as those in the air cooling mode. Thus, in the air heating mode of this embodiment, the air cooled by the interior evaporator 20 is heated again in the interior condenser 12, so as to achieve the air heating of the vehicle interior.

As mentioned above, the refrigeration cycle device 10 of this embodiment can suppress the degradation of the performance of the refrigeration cycle device 10 due to unnecessary transfer of the heat between the outside air and the refrigerant in the accumulator 17 in the air cooling mode, like the sixth embodiment.

In the air heating mode, the refrigerant is not retained in the accumulator 17, and the accumulator 17 simply serves as a refrigerant passage, and thereby it can suppress the degradation of the performance of the refrigeration cycle device 10 due to unnecessary transfer of the heat between the outside air and the refrigerant in the accumulator 17.

Ninth Embodiment

Figure 24:
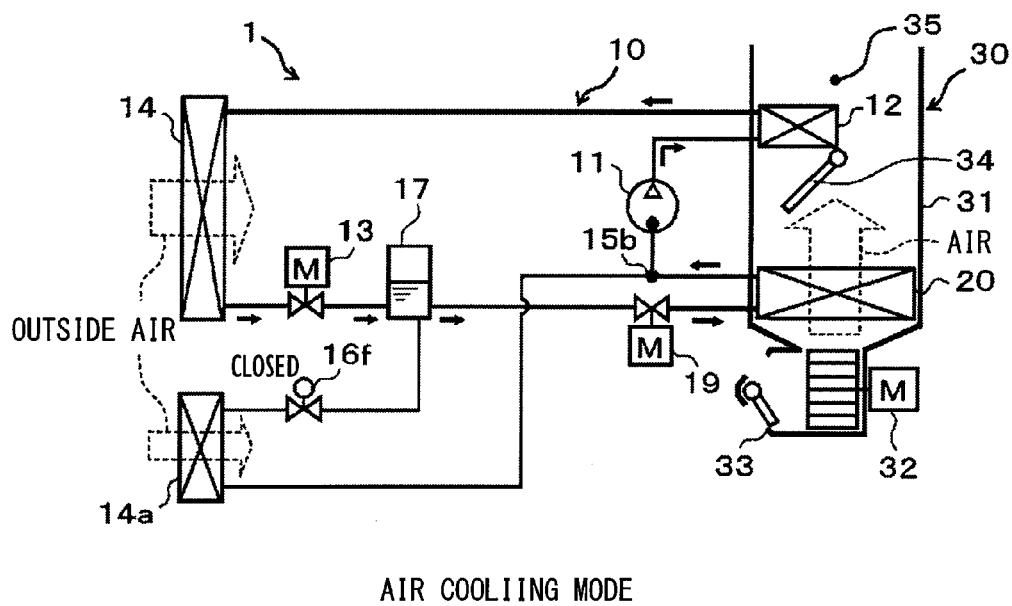
FIG. 24 is an entire configuration diagram showing a refrigerant circuit in an air cooling mode of a refrigeration cycle device according to a ninth embodiment.
Figure 25:
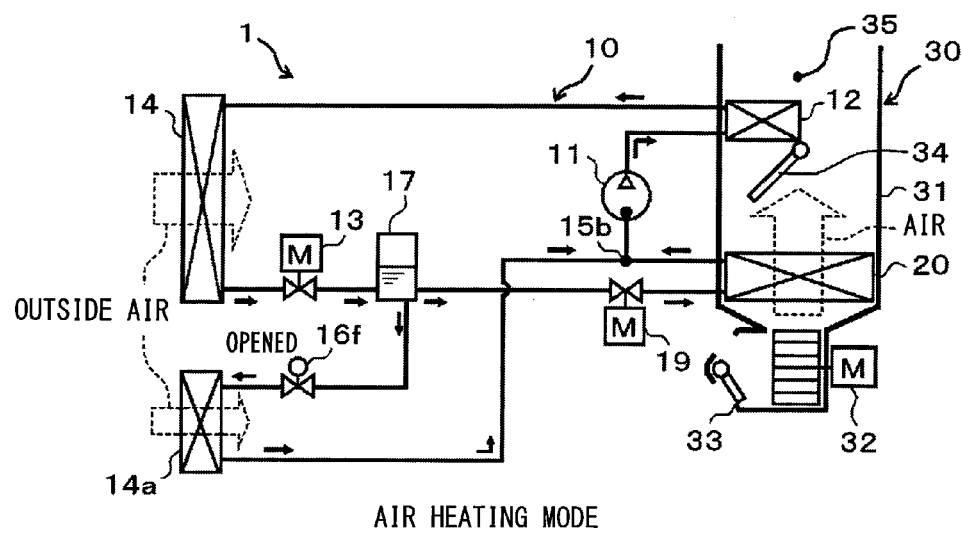
FIG. 25 is an entire configuration diagram showing a refrigerant circuit in an air heating mode of the refrigeration cycle device in the ninth embodiment.

In this embodiment, as compared to the refrigeration cycle device 10 of the sixth embodiment, as shown in the entire configuration diagrams of FIGS. 24 and 25, the arrangement of the first expansion valve 13 is changed in the same manner as in the eighth embodiment, and the exterior unit side opening/closing valve 16f is disposed in a refrigerant passage leading from the liquid-phase refrigerant outflow port side of the accumulator 17 to the refrigerant inlet side of the auxiliary exterior heat exchanger 14a.

In the refrigeration cycle device 10 of this embodiment, the merging portion 15b that is the same as that in the first embodiment is provided. The refrigerant outflow port of the auxiliary exterior heat exchanger 14a is connected to one of the refrigerant inflow ports of the merging portion 15b. The refrigerant outflow port of the interior evaporator 20 is connected to the other one of the refrigerant inflow ports of the merging portion 15b. Further, the liquid-phase refrigerant outflow port side of the accumulator 17 is connected to an inlet of the second expansion valve 19. The structures of other components are the same as those in the sixth embodiment.

In the air cooling mode of this embodiment, the air conditioning controller closes the exterior unit side opening/closing valve 16f, completely opens the first expansion valve 13, and sets the second expansion valve 19 in the throttle state. The operations of other devices to be controlled are the same as those in the air cooling mode of the sixth embodiment.

Thus, in the air cooling mode of this embodiment, as indicated by solid arrows in FIG. 24, the same refrigerant circuit as that in the air cooling mode of the first embodiment can be configured to achieve the air cooling of the vehicle interior in the same manner as that in the air cooling mode of the first embodiment.

In the air heating mode of this embodiment, the air conditioning controller opens the exterior unit side opening/closing valve 16f, sets the first expansion valve 13 in the throttle state, and fully opens the second expansion valve 19. The operations of other devices to be controlled are the same as those in the air heating mode of the sixth embodiment.

Thus, in the air heating mode of this embodiment, as indicated by solid arrows of FIG. 25, switching is performed to a refrigerant circuit for circulating the refrigerant through the compressor 11, the interior condenser 12, the exterior heat exchanger 14, the first expansion valve 13, the accumulator 17, the exterior unit side opening/closing valve 16f, the auxiliary exterior heat exchanger 14a, and the compressor 11 in that order, while circulating the refrigerant through the accumulator 17, the second expansion valve 19, the interior evaporator 20, and the compressor 11 in that order.

Figure 26:
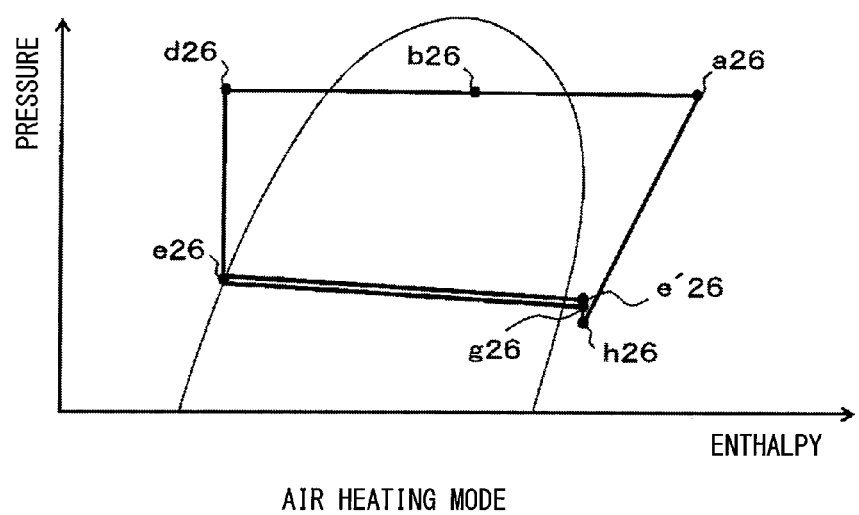
FIG. 26 is a Mollier chart showing the state of refrigerant in the air heating mode of the refrigeration cycle device in the ninth embodiment.

Thus, the refrigeration cycle device 10 in the air heating mode changes the state of the refrigerant as illustrated in a Mollier chart of FIG. 26. Specifically, a high-pressure refrigerant discharged from the compressor 11 (as indicated at a point a26 in FIG. 26) flows into the interior condenser 12, and exchanges heat with the air to dissipate heat therefrom (as indicated from the point a26 to a point b26 in FIG. 26). In this way, a part of the air having passed through the interior evaporator 20 is heated.

The refrigerant flowing from the interior condenser 12 flows into the exterior heat exchanger 14 to exchange heat with the outside air, thereby decreasing the enthalpy (as indicated from the point b26 to a point d26 in FIG. 26). The refrigerant flowing out of the exterior heat exchanger 14 flows into the first expansion valve 13, and is then decompressed to have a lower pressure than that in the cooling mode (as indicated from the point d26 to a point e26 in FIG. 26). The low-pressure refrigerant decompressed by the first expansion valve 13 flows into the accumulator 17.

In the air heating mode, since the exterior unit side opening/closing valve 16f is open, the liquid-phase refrigerant separated by the accumulator 17 flows out of both a side of the auxiliary exterior heat exchanger 14a and a side of the interior evaporator 20. The refrigerant flowing out toward the auxiliary exterior heat exchanger 14a absorbs heat from the outside air in the auxiliary exterior heat exchanger 14a to evaporate itself, and flows into one of the refrigerant inflow ports of the merging portion 15b (as indicated from the point e26 to a point e'26 of FIG. 26).

The refrigerant flowing out toward the interior evaporator 20 via the fully opened second expansion valve 19 absorbs heat from air blown from the blower 32 in the interior evaporator 20 to evaporate itself (as indicated from the point e26 to a point g26 in FIG. 26). In this way, the air is cooled. The refrigerant flowing out of the interior evaporator 20 flows into the other one of the refrigerant inflow ports of the merging portion 15b to be merged with the refrigerant having flowed from the auxiliary exterior heat exchanger 14a.

The refrigerant flowing out of the merging portion 15b is drawn into the compressor 11 and compressed again (as indicated from the point h26 to the point a26 in FIG. 26). Thus, also in the air heating mode of this embodiment, the air cooled by the interior evaporator 20 is heated again in the interior condenser 12 to achieve the air-heating of the vehicle interior.

As mentioned above, the refrigeration cycle device 10 of this embodiment can suppress the degradation of the performance of the refrigeration cycle device 10 due to unnecessary transfer of the heat between the outside air and the refrigerant in the accumulator 17 in any one of the air cooling mode and the air heating mode, like the first embodiment.

In the air heating mode, the refrigeration cycle device 10 of this embodiment can perform switching to a refrigerant circuit for allowing the liquid-phase refrigerant to flow out of the accumulator 17 into the auxiliary interior heat exchanger 14a and the interior evaporator 20 in parallel to draw the refrigerant into the compressor 11. Thus, the fixed throttle 22 or the like is provided, like the second embodiment, it can also make a temperature range of the refrigerant evaporation temperature in the auxiliary interior heat exchanger 14a different from that of the refrigerant evaporation temperature of the interior evaporator 20.

For example, the fixed throttle 22 may be disposed in the refrigerant passage leading from the refrigerant outflow port of the auxiliary interior heat exchanger 14a to one of the refrigerant inflow ports of the merging portion 15b, whereby the opening degree of the second expansion valve 19 may be controlled to correspond to the same amount of decompression by the fixed throttle 22. Thus, the refrigerant evaporation temperature of the interior evaporator 20 can be set lower than that of the auxiliary interior heat exchanger 14a.

Tenth Embodiment

Figure 27:
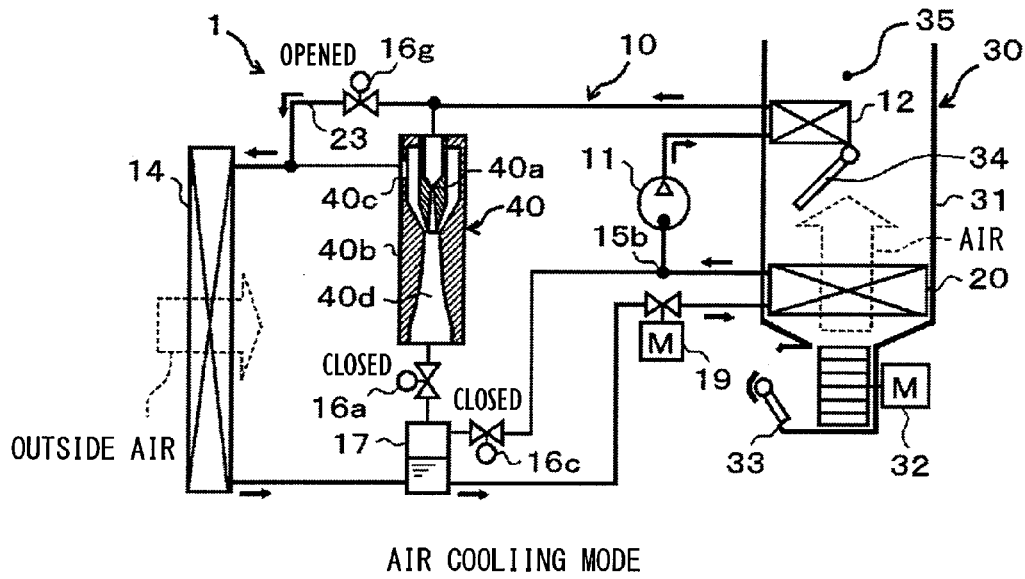
FIG. 27 is an entire configuration diagram showing a refrigerant circuit in an air cooling mode of a refrigeration cycle device according to a tenth embodiment.
Figure 28:
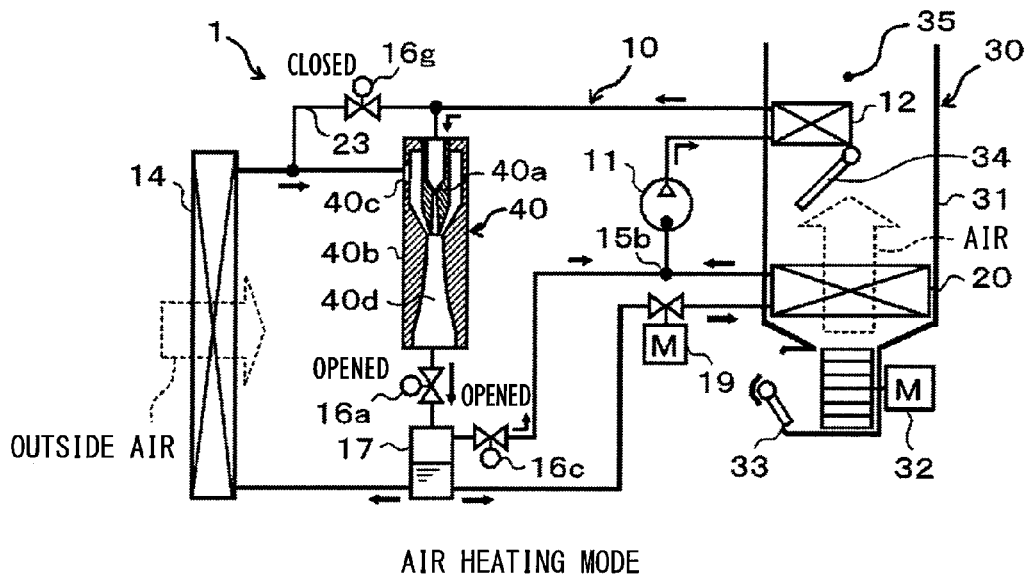
FIG. 28 is an entire configuration diagram showing a refrigerant circuit in an air heating mode of the refrigeration cycle device in the tenth embodiment.

This embodiment will describe an example in which an ejector 40 is employed instead of the first expansion valve 13 to change the structure of the refrigerant circuit with respect to the refrigeration cycle device 10 of the first embodiment as shown in the entire configuration diagrams of FIGS. 27 and 28.

The ejector 40 serves as a first decompression device for decomposing the refrigerant flowing out of the interior condenser 12 in the air heating mode, while serving as a refrigerant circulation unit (refrigerant transport unit) that draws (transports) the refrigerant by a suction effect of the refrigerant injected at a high velocity to allow the refrigerant to circulate through the cycle.

More specifically, the ejector 40 includes a nozzle 40a and a body 40b. The nozzle 40a is formed of metal (e.g., brass, stainless alloy) in a substantially cylindrical shape while tapered down toward the refrigerant flow direction. Thus, the area of a refrigerant passage formed in the nozzle is changed to isentropically decompress the refrigerant.

The refrigerant passage formed in the nozzle 40a has a throat portion (portion with the minimum passage area) whose refrigerant passage area is minimized, and further a spreading out portion whose refrigerant passage area is gradually increased toward a refrigerant injecting port for injecting the refrigerant from the throat portion. That is, the nozzle 40a is configured as a laval nozzle, and is set such that the flow rate of refrigerant in the throat portion is equal to or higher than the speed of sound. It is apparent that the nozzle 40a may be formed of a tapered nozzle.

The body 40b is formed of metal (e.g., aluminum) in a substantially cylindrical shape. The body 40b serves as a fixing member that supports and fixes the nozzle 40a therein to form an outer envelope of the ejector 40. Specifically, the nozzle 40a is pressed and fixed into the body 40b to be accommodated in a part of the body 40b on one end side in the longitudinal direction of the body 40b. Thus, the refrigerant does not leak from a fixed portion (pressed portion) between the nozzle 40a and body 40b.

A refrigerant suction port 40c is formed in communication with a refrigerant injection port of the nozzle 40a to penetrate a part on the outer peripheral side surface of the body 40b corresponding to the outer peripheral side of the nozzle 40a. The refrigerant suction port 40c is a through hole that draws the refrigerant flowing out of one of the refrigerant inflow and outlet ports of the exterior heat exchanger 14, into the ejector 40 by a suction effect of the refrigerant injected from the nozzle 40a in the air heating mode.

The inside of the body 40b is provided with a suction passage for guiding the suction refrigerant drawn from the refrigerant suction port 40c to a diffuser 40d, and with the diffuser 40d serving as a booster for mixing the injection refrigerant with the suction refrigerant flowing therein via the refrigerant suction port 40c and the suction passage to increase the pressure of the mixture.

The suction passage is formed in a space between the outer peripheral side of the tapered tip periphery of the nozzle 40a, and the inner peripheral side of the body 40b. The refrigerant passage area of the suction passage is gradually decreased toward the refrigerant flow direction. Thus, the flow rate of the drawn refrigerant circulating through the suction passage is gradually increased, thereby decreasing the energy loss (mixing loss) when mixing the drawn refrigerant with the injected refrigerant by the diffuser 40d.

The diffuser 40d continuously leads to an outlet of the suction passage, and is formed such that the refrigerant passage area is gradually increased. Thus, the diffuser 40d has a function of converting a velocity energy of a mixed refrigerant of the injected refrigerant and the drawn refrigerant into a pressure energy, while mixing the injected refrigerant and the drawn refrigerant, that is, a function of increasing a pressure of the mixed refrigerant by decelerating the flow velocity of the mixed refrigerant.

The refrigerant outlet side of the diffuser 40d of the ejector 40 is connected to the gas-phase side inflow port of the accumulator 17 via the gas-phase inlet side opening/closing valve 16a. The accumulator 17 of this embodiment is provided with two liquid-phase refrigerant inflow and outflow ports. One of the liquid-phase refrigerant inflow and outflow ports is connected to the other one of the refrigerant inflow and outflow ports of the exterior heat exchanger 14, and the other one of the liquid-phase refrigerant inflow and outflow ports is connected to the inlet side of the second expansion valve 19.

Further, the refrigeration cycle device 10 of this embodiment includes an ejector bypass passage 23 that leads the refrigerant flowing out of the interior condenser 12 to one of the refrigerant inflow and outflow ports of the exterior heat exchanger 14, while bypassing the ejector 40. The ejector bypass passage 23 is provided with an ejector side opening/closing valve 16g for opening/closing the refrigerant passage.

Note that the ejector side opening/closing valve 16g is an electromagnetic valve having the same structure as that of each of the gas-phase inlet side opening/closing valves 16a and the gas-phase outlet side opening/closing valve 16c to thereby constitute a refrigerant circuit switch of this embodiment. The structures of other components are the same as those in the first embodiment.

Next, the operation of the above-mentioned structure according to this embodiment will be described below. First, in the air cooling mode, the air conditioning controller closes the gas-phase inlet side opening/closing valve 16a and the gas-phase outlet side opening/closing valve 16c, opens the ejector side opening/closing valve 16g, and sets the second expansion valve 19 in the throttle state. The operations of other devices to be controlled are the same as those in the air cooling mode of the first embodiment.

Thus, in the air cooling mode of this embodiment, as indicated by solid arrows of FIG. 27, switching is performed to a refrigerant circuit that circulates a refrigerant through the compressor 11, the interior condenser 12, the ejector side opening/closing valve 16g, the exterior heat exchanger 14, the accumulator 17, the second expansion valve 19, the interior evaporator 20, and the compressor 11 in that order.

That is, in the air cooling mode of this embodiment, the substantially same refrigerant circuit as that in the air cooling mode of the first embodiment can be configured to achieve the air cooling of the vehicle interior in the same manner as that in the air cooling mode of the first embodiment.

Next, the air heating mode will be described below. In the air heating mode, the air conditioning controller closes the ejector side opening/closing valve 16g, opens the gas-phase inlet side opening/closing valve 16a and the gas-phase outlet side opening/closing valve 16c, and further completely opens the second expansion valve 19. The operations of other devices to be controlled are the same as those in the air heating mode of the first embodiment.

Thus, in the air heating mode of this embodiment, as indicated by solid arrows of FIG. 28, switching is performed to a refrigerant circuit for circulating the refrigerant through the compressor 11, the interior condenser 12, the ejector 40, the gas-phase inlet side opening/closing valve 16a, the accumulator 17, (second expansion valve 19), the interior evaporator 20, and the compressor 11 in that order, while flowing the refrigerant to the accumulator 17, the exterior heat exchanger 14, and a refrigerant suction port 40c of the ejector 40 in that order.

Figure 29:
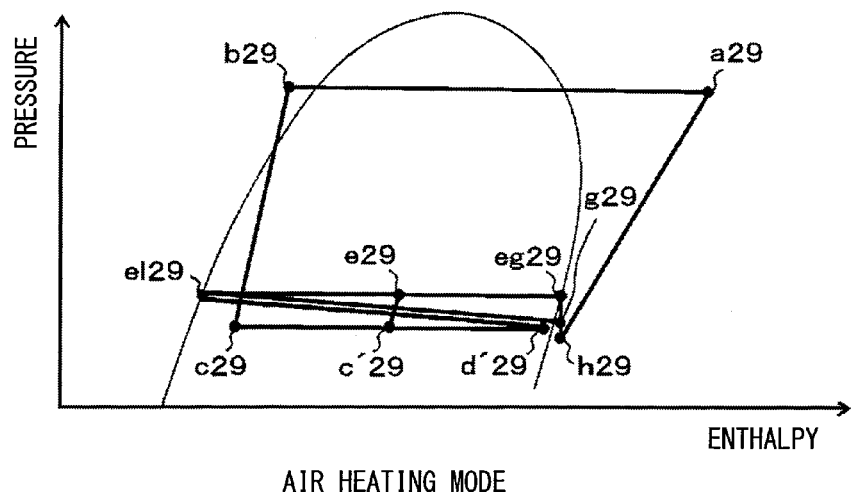
FIG. 29 is a Mollier chart showing the state of refrigerant in the air heating mode of the refrigeration cycle device in the tenth embodiment.

Thus, the refrigeration cycle device 10 in the air heating mode changes the state of the refrigerant as illustrated in a Mollier chart of FIG. 29. Specifically, a high-pressure refrigerant discharged from the compressor 11 (as indicated at a point a29 in FIG. 29) flows into the interior condenser 29, and exchanges heat with the air to dissipate heat therefrom (as indicated from the point a29 to a point b29 in FIG. 29), like the first embodiment. In this way, the air having passed through the interior evaporator 20 is heated.

The refrigerant flowing out of the interior condenser 12 is decompressed and injected by the nozzle 40a of the ejector 40 to have a lower pressure than that in the air cooling mode. Specifically, since the ejector side opening/closing valve 16g is closed, the refrigerant flowing into the nozzle 40a of the ejector 40 is isentropically decompressed and injected (as indicated from the point b29 to a point c29 in FIG. 29). In this embodiment, as shown in the Mollier chart of FIG. 29, in the normal operation of the air heating mode, the refrigerant passage area of the nozzle 40a is set such that a supercooling degree of the refrigerant on the outlet side of the interior condenser 12 approaches the target supercooling degree KSC.

The refrigerant flowing out of one of the refrigerant inflow and outflow ports of the exterior heat exchanger 14 is drawn from the refrigerant suction port 40c of the ejector 40 by the suction effect of the injection refrigerant injected from the nozzle 40a. The injection refrigerant injected from the nozzle 40a and the suction refrigerant drawn via the refrigerant suction port 40c flow into the diffuser 40d of the ejector 40 (as indicated from the point c29 to a point c'29, and from a d'29 to the point c'29 in FIG. 29, respectively).

The diffuser 40d converts the velocity energy of the refrigerant into the pressure energy thereof by increasing the refrigerant passage area. Thus, the pressure of the mixed refrigerant is increased, while mixing the injection refrigerant and the suction refrigerant (as indicated from the point c'29 to a point e29 in FIG. 29). The refrigerant flowing out of the diffuser 40d flows into the accumulator 17 to be separated into gas and liquid phases (as indicated from the point e29 to a point eg29, and from the point e29 to a point e129 in FIG. 29, respectively).

The gas-phase refrigerant separated by the accumulator 17 (as indicated at the point eg29 in FIG. 29) flows into one of the refrigerant inflow ports of the merging portion 15b. The refrigerant flowing to a side of one of the refrigerant inflow and outflow ports of the exterior heat exchanger 14 in the liquid-phase refrigerant separated by the accumulator 17 exchanges heat with outside air blown from a blower fan in the exterior heat exchanger 14 to evaporate itself (as indicated from the point e129 to a point d'29 in FIG. 29). The refrigerant flowing out of the other refrigerant inflow and outflow ports of the exterior heat exchanger 14 is drawn from the refrigerant suction port 40c of the ejector 40.

The refrigerant flowing out to a side of the second expansion valve 19 in the liquid-phase refrigerant separated by the accumulator 17 flows into the interior evaporator 20, and exchanges heat with the air blown from the blower 32 to evaporate itself (as indicated from the point e129 to a point g29 in FIG. 29). In this way, the air is cooled. At this time, the second expansion valve 19 is fully opened, so that the refrigerant flowing from the accumulator 17 flows into the interior evaporator 20, while being hardly decompressed.

Then, the refrigerant flowing out of the interior evaporator 20 flows into the other one of the refrigerant inflow ports of the merging portion 15b, and is then merged with the refrigerant flowing out of the gas-phase refrigerant outflow port of the accumulator 17. The refrigerant flowing out of the merging portion 15b is drawn into the compressor 11 and compressed again (as indicated from the point h29 to the point a29 in FIG. 29).

As mentioned above, in an air heating mode, like the air heating mode of the first embodiment, the air cooled by the interior evaporator 20 is heated again in the interior condenser 12 to achieve the air-heating of the vehicle interior. Therefore, the vehicle air conditioner 1 of this embodiment can also achieve the air cooling and air heating of the vehicle interior.

The refrigeration cycle device 10 of this embodiment allows the high-pressure refrigerant having flowed out of the interior condenser 12 to flow into the accumulator 17 without decompressing the refrigerant in the air cooling mode, and allows the low-pressure refrigerant decompressed by the ejector 40 to flow into the accumulator 17 in the heating mode. Thus, like the first embodiment, this embodiment can suppress the increase in difference between the temperature of the refrigerant in the accumulator 17 disposed in the external space and the outside air temperature even when switching to any operation mode.

In the air cooling mode, the refrigerant exchanging heat with the outside air in the exterior heat exchanger 14 flows into the accumulator 17, so that the refrigerant temperature in the accumulator 17 can be substantially equal to the outside air temperature.

Therefore, the refrigeration cycle device 10 of this embodiment can suppress the degradation of performance of the refrigeration cycle device 10 due to unnecessary transfer of the heat between the outside air and the refrigerant in the accumulator 17 disposed in the external space even when switching to the refrigerant circuit in any operation mode.

In the air heating mode of this embodiment, because the refrigerant whose pressure is increased by the diffuser 40d of the ejector 40 is drawn into the compressor 11, it can decrease the driving power of the compressor 11, thereby improving a cycle efficiency (COP) of the refrigeration cycle device.

Eleventh Embodiment

Figure 30:
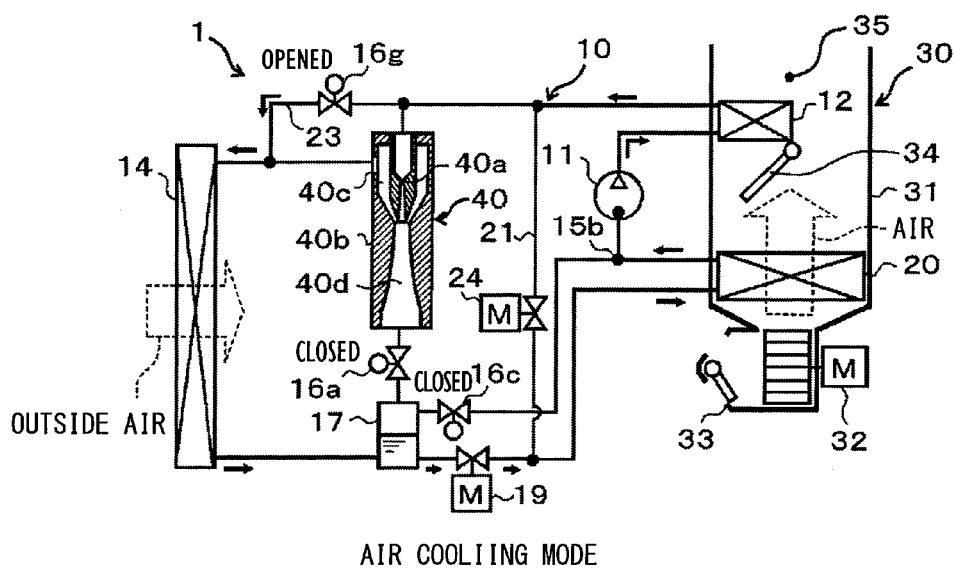
FIG. 30 is an entire configuration diagram showing a refrigerant circuit in an air cooling mode of a refrigeration cycle device according to an eleventh embodiment.
Figure 31:
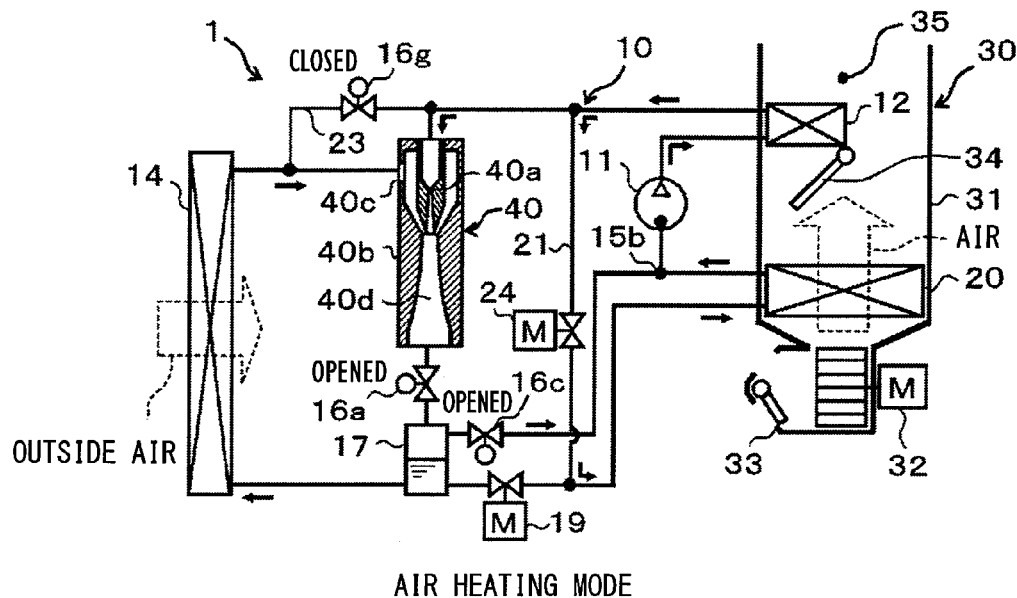
FIG. 31 is an entire configuration diagram showing a refrigerant circuit in an air heating mode of the refrigeration cycle device in the eleventh embodiment.

This embodiment differs from the tenth embodiment in that as shown in the entire configuration diagrams of FIGS. 30 and 31, a bypass passage 21 and a bypass passage expansion valve 24 are added to the refrigeration cycle device 10 of the tenth embodiment by way of example. Specifically, the bypass passage 21 of this embodiment is a refrigerant passage that guides the refrigerant flowing out of the interior condenser 12 to the refrigerant inlet side of the interior evaporator 20, while bypassing the ejector 40, the exterior heat exchanger 14, the accumulator 17, the second expansion valve 19, and like.

The bypass passage expansion valve 24 is a variable throttle mechanism having the same structure as that of the second expansion valve 19. The bypass passage expansion valve 24 and the second expansion valve 19 in this embodiment have a function of completely closing a refrigerant passage leading from the liquid-phase refrigerant outflow ports of the bypass passage 21 and accumulator 17 to the connection portion of the bypass passage 21 when the respective openings of the above valves are completely closed.

Therefore, the bypass passage expansion valve 24 and the second expansion valve 19 in this embodiment constitute the refrigerant circuit switch together with the gas-phase inlet side opening/closing valve 16a, the gas-phase outlet side opening/closing valve 16c, and the ejector side opening/closing valve 16g. Further, the bypass passage opening/closing valve 24 of this embodiment serves as a bypass passage opening/closing portion of the refrigerant circuit switch.

Next, the operation of the above-mentioned structure according to this embodiment will be described below. First, in the air cooling mode, the air conditioning controller closes the gas-phase inlet side opening/closing valve 16a and the gas-phase outlet side opening/closing valve 16c, opens the ejector side opening/closing valve 16g, sets the second expansion valve 19 in the throttle state, and completely closes the bypass passage expansion valve 24. The operations of other devices to be controlled are the same as those in the air cooling mode of the tenth embodiment.

Thus, in the air cooling mode of this embodiment, as indicated by solid arrows in FIG. 30, the same refrigerant circuit as that in the air cooling mode of the tenth embodiment can be configured to achieve the air cooling of the vehicle interior in the same manner as that in the air cooling mode of the tenth embodiment.

In the air heating mode of this embodiment, the air conditioning controller closes the ejector side opening/closing valve 16g, opens the gas-phase inlet side opening/closing valve 16a and the gas-phase outlet side opening/closing valve 16c, sets the bypass passage expansion valve 24 in the throttle state, and completely closes the second expansion valve 19. The operations of other devices to be controlled are the same as those in the air heating mode of the tenth embodiment.

Thus, in the air heating mode of this embodiment, as indicated by solid arrows of FIG. 31, switching is performed to a refrigerant circuit for circulating the refrigerant through the compressor 11, the interior condenser 12, the ejector 40, the gas-phase inlet side opening/closing valve 16a, the accumulator 17, the gas-phase outlet side opening/closing valve 16c, and the compressor 11 in that order, while flowing the refrigerant to the accumulator 17, the exterior heat exchanger 14, and the refrigerant suction port 40c of the ejector 40 in that order, and further circulating the refrigerant through the interior condenser 12, the bypass passage 21, the bypass passage expansion valve 24, the interior evaporator 20, and the compressor 11 in that order.

Figure 32:
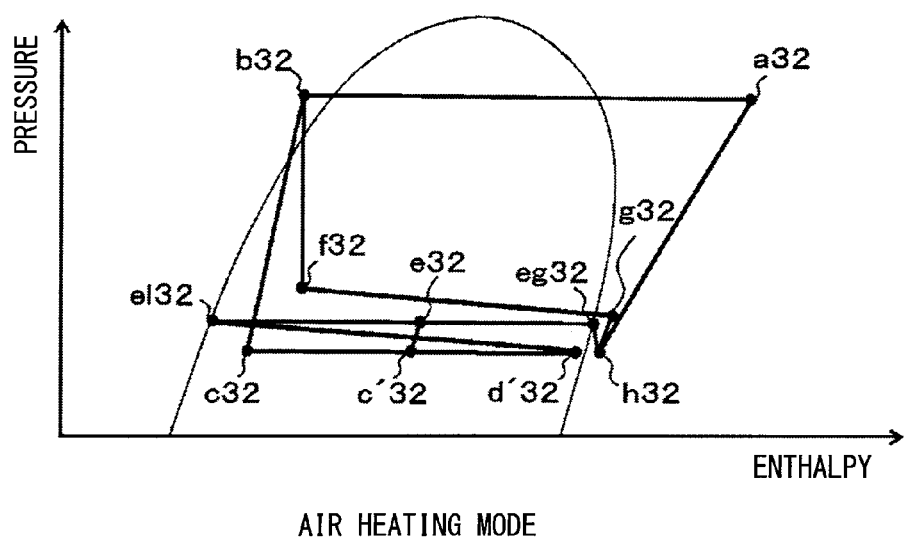
FIG. 32 is a Mollier chart showing the state of refrigerant in the air heating mode of the refrigeration cycle device in the eleventh embodiment.

Thus, the refrigeration cycle device 10 in the air heating mode changes the state of the refrigerant as illustrated in a Mollier chart of FIG. 32. Specifically, a high-pressure refrigerant discharged from the compressor 11 (as indicated at a point a32 in FIG. 32) flows into the interior condenser 32, and exchanges heat with the air to dissipate heat therefrom (as indicated from the point a32 to a point b32 in FIG. 32), like the tenth embodiment. In this way, the air having passed through the interior evaporator 20 is heated.

The flow of refrigerant flowing out of the interior condenser 12 is divided into a flow to the ejector 40 and another flow to the bypass passage expansion valve 24 via the bypass passage 21 because the ejector side opening/closing valve 16g is closed with the bypass passage expansion valve 24 set in the throttle state. The refrigerant flowing into the ejector 40 is isentropically decompressed by the nozzle 40a to have a lower pressure than that in the air cooling mode (as indicated from the point b32 to a point c32 in FIG. 32), and flows into the accumulator 17, like the tenth embodiment.

At this time, like the tenth embodiment, the refrigerant flowing out of one of the refrigerant inflow and outflow ports of the exterior heat exchanger 14 is drawn from the refrigerant suction port 40c by the suction effect of the injection refrigerant injected from the nozzle 40a (as indicated from the point c32 to a point c'32, and from a point d'32 to the point c'32 in FIG. 32). Further, the diffuser 40d increases the pressure of the refrigerant, while mixing the suction refrigerant and the injection refrigerant (as indicated from the point c'32 to a point e32 in FIG. 32).

The gas-phase refrigerant separated by the accumulator 17 (as indicated at the point eg32 in FIG. 32) flows into one of the refrigerant inflow ports of the merging portion 15b. The liquid-phase refrigerant separated by the accumulator 17 flows into the exterior heat exchanger 14, and exchanges heat with the outside air blown from the blower fan to evaporate itself (as indicated from the point e132 to a point d'32 in FIG. 32). The refrigerant flowing out of the other refrigerant inflow and outflow ports of the exterior heat exchanger 14 is drawn from the refrigerant suction port 40c of the ejector 40.

In contrast, the refrigerant flowing out of the interior condenser 12 into the bypass passage 21 is decompressed by the bypass passage expansion valve 24 into a low-pressure refrigerant (as indicated from the point b32 to a point f32 in FIG. 32). At this time, the opening degree of the bypass passage expansion valve 24 is adjusted such that the pressure of the refrigerant on the outlet side of the interior evaporator 20 is substantially equal to that of the refrigerant in the accumulator 17.

The low-pressure refrigerant decompressed by the bypass passage expansion valve 24 flows into the interior evaporator 20, and absorbs heat from the air blown from the blower 32 to evaporate itself (from the point f32 to a point g32 in FIG. 32). In this way, the air is cooled. Then, the refrigerant flowing out of the interior evaporator 20 flows into the other one of the refrigerant inflow ports of the merging portion 15b, and is then merged with the refrigerant flowing out of the gas-phase refrigerant outflow port of the accumulator 17. The refrigerant flowing out of the merging portion 15b is drawn into the compressor 11 and compressed again (as indicated from the point h32 to the point a32 in FIG. 32).

As mentioned above, in the air heating mode, the air cooled by the interior evaporator 20 is heated again in the interior condenser 12 to achieve the air-heating of the vehicle interior, like the air heating mode of the first embodiment. Therefore, the vehicle air conditioner 1 of this embodiment can also achieve the air cooling and air heating of the vehicle interior.

The refrigeration cycle device 10 of this embodiment can suppress the degradation of the performance of the refrigeration cycle device 10 due to unnecessary transfer of the heat between the outside air and the refrigerant in the accumulator 17 in any one of the air cooling mode and the air heating mode, like the tenth embodiment.

In the air heating mode of this embodiment, because the bypass passage expansion valve 24 is brought into the throttle state, it can constitute a refrigerant circuit for flowing the refrigerant from the interior condenser 12 into the exterior heat exchanger 14 via the ejector 40 and accumulator 17, as well as a refrigerant circuit for flowing the refrigerant into the interior evaporator 20 via the bypass passage expansion valve 24.

The opening degree of the bypass passage expansion valve 24 is adjusted such that the pressure of refrigerant on the outlet side of the interior evaporator 20 is substantially equal to that of the refrigerant in the accumulator 17. Thus, the refrigerant evaporation pressure (refrigerant evaporation temperature) in the exterior heat exchanger 14 can be lower than that in the interior evaporator 20 by an amount of increase in pressure of the exterior heat exchanger 14.

As a result, in the air heating mode of this embodiment, the refrigerant evaporation temperature of the exterior heat exchanger 14 is sufficiently reduced without using the fixed throttle 22, unlike the second embodiment, so that the refrigerant can absorb enough heat to heat the space to be air-conditioned, from the outside air, while increasing the refrigerant evaporation temperature of the interior evaporator 20 up to a level that does not cause the frost formation.

Twelfth Embodiment

Figure 33:
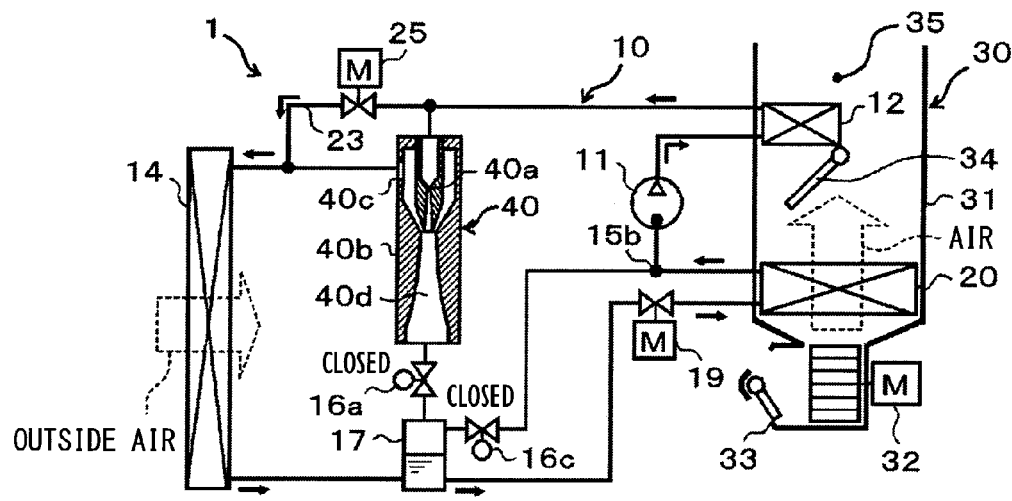
FIG. 33 is an entire configuration diagram showing a refrigerant circuit in an air cooling mode and a second heating mode of a refrigeration cycle device according to a twelfth embodiment.
Figure 34:
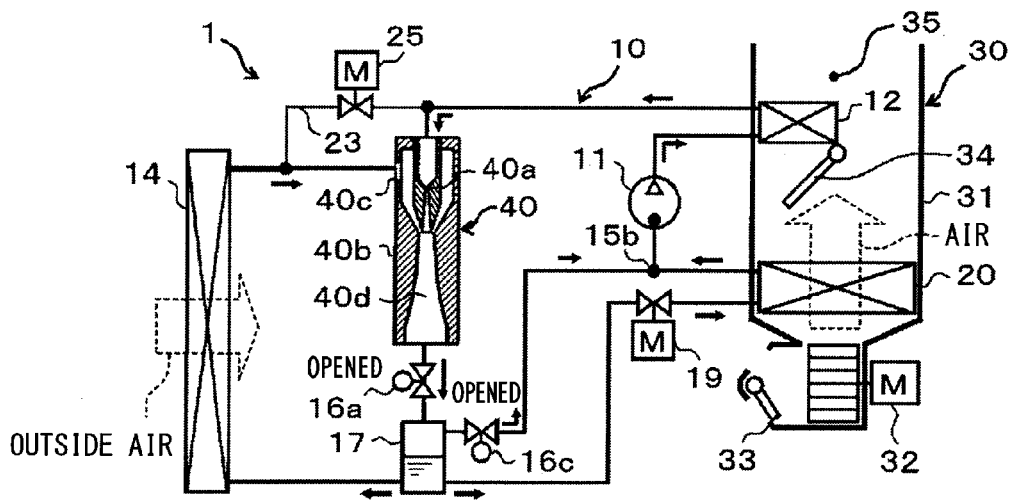
FIG. 34 is an entire configuration diagram showing a refrigerant circuit in an air heating mode of the refrigeration cycle device in the twelfth embodiment.

This embodiment will describe an example in which a third expansion valve 25 is employed instead of the ejector side opening/closing valve 16g with respect to the refrigeration cycle device 10 of the tenth embodiment as shown in the entire configuration diagrams of FIGS. 33 and 34.

The third expansion valve 25 has the same basic structure as that of each of the bypass passage expansion valve 24 and the second expansion valve in the eleventh embodiment. The vehicle air conditioner 1 of this embodiment can operate in the second air heating mode (second heating mode) of heating air with a lower heating capacity than that in the air heating mode, in addition to the operations of the air cooling mode and the air heating mode.

In general, the operation of the air heating mode is performed to increase the temperature of the vehicle interior to a temperature comfortable to a passenger (for example, about 25° C.) when the outside air temperature is low (for example, when the outside air temperature is 20° C. or less). Further, even when the outside air temperature is not relatively low (for example, when the outside air temperature is higher than 20° C.), in order to prevent fogging of windows of the vehicle, the operation of the air heating mode is carried out to perform the dehumidification-air heating which involves cooling and dehumidifying the air, and heating again the dehumidified low-temperature air.

In such a dehumidification-air heating, a lower heating capacity than that in the air heating mode can sufficiently heat the air. In this embodiment, switching is performed to the operation of the second heating mode in the dehumidification-air heating, thereby preventing the unnecessary increase in power consumption of the compressor 11. Now, the respective operation modes of this embodiment will be described.

First, in the air cooling mode of this embodiment, the air conditioning controller closes the gas-phase inlet side opening/closing valve 16a and the gas-phase outlet side opening/closing valve 16c, fully opens the third expansion valve 25, and sets the second expansion valve 19 in the throttle state. Thus, in the air cooling mode, as indicated by solid arrows of FIG. 33, switching is performed to a refrigerant circuit for allowing the refrigerant to flow in the same manner as that in the air cooling mode of the tenth embodiment.

The operations of other devices to be controlled are the same as those in the air cooling mode of the tenth embodiment. Thus, in the air cooling mode of this embodiment, the air cooling of the vehicle interior can be achieved in the same way as that in the air cooling mode of the tenth embodiment.

In the air heating mode, the air conditioning controller completely closes the third expansion valve 25, opens the gas-phase inlet side opening/closing valve 16a and the gas-phase outlet side opening/closing valve 16c, and completely opens the second expansion valve 19. Thus, in the air heating mode of this embodiment, as indicated by solid arrows of FIG. 34, switching is performed to a refrigerant circuit for allowing the refrigerant to flow in the same manner as that in the air heating mode of the tenth embodiment.

The operations of other devices to be controlled are the same as those in the air heating mode of the tenth embodiment. Thus, in the air heating mode of this embodiment, the air heating of the vehicle interior can be achieved in the same way as that in the air heating mode of the tenth embodiment.

In the second air heating mode, the air conditioning controller closes the gas-phase inlet side opening/closing valve 16a and the gas-phase outlet side opening/closing valve 16c, and changes the opening degrees of the third expansion valve 25 and the second expansion valve 19. Thus, in the second air heating mode of this embodiment, as indicated by solid arrows of FIG. 33, switching is performed to a refrigerant circuit for allowing the refrigerant to flow in the same manner as that in the air cooling mode.

As to the opening degrees of the third expansion valve 25 and the second expansion valve 19, the opening degree of the third expansion valve 25 is decreased and the opening degree of the second expansion valve 19 is increased, together with an increase in target outlet temperature TAO. In this way, in the second air heating mode, three-staged operation modes from the first to third modes can be carried out as will be described below. The operations of other devices to be controlled are the same as those in the air heating mode of the tenth embodiment.

(1) First Mode

A first mode is performed when the target outlet temperature TAO is equal to or less than a first predetermined reference temperature in the second air heating mode. In the first mode, the air conditioning controller adjusts the opening degrees of the third expansion valve 25 and the second expansion valve 19 in such a range that the temperature of refrigerant flowing out of the third expansion valve 25 is higher than the outside air temperature. Thus, in the first mode, the state of refrigerant circulating through the cycle changes as shown in the Mollier chart of FIG. 35.

Figure 35:
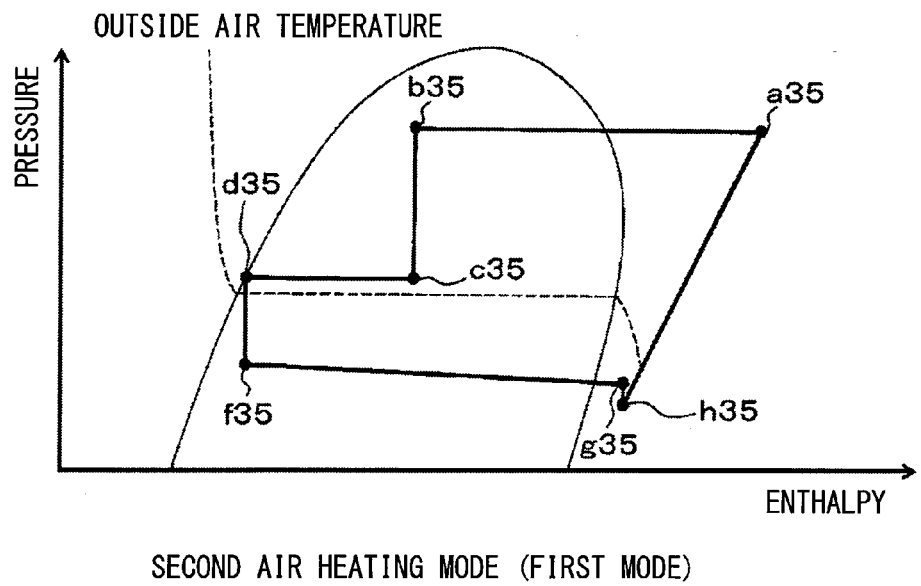
FIG. 35 is a Mollier chart showing the state of refrigerant in a first mode of the second air heating mode of the refrigeration cycle device in the twelfth embodiment.

That is, as shown in FIG. 35, the high-pressure refrigerant (as indicated by a point a35) discharged from the compressor 11 flows into the interior condenser 12, and then cooled by the interior evaporator 20 to exchange heat with the air dehumidified, thereby dissipating heat therefrom (as indicated from the point a35 to a point b35 in FIG. 35). Thus, the air is heated. The refrigerant flowing out of the interior condenser 12 flows into the third expansion valve 25, and is then decompressed to an intermediate-pressure refrigerant (as indicated from the point b35 to a point c35 in FIG. 35).

The intermediate-pressure refrigerant decompressed by the third expansion valve 25 flows into the exterior heat exchanger 14 to exchange heat with the outside air blown from the blower fan, thereby decreasing the enthalpy (as indicated from the point c35 to a point d35 in FIG. 35). The refrigerant flowing out of the exterior heat evaporator 14 flows into the accumulator 17, and is then separated into liquid and gas phases. The liquid-phase refrigerant separated by the accumulator 17 is decompressed by the second expansion valve 19 to a low-pressure refrigerant (as indicated from the point d35 to a point f35 in FIG. 35).

The low-pressure refrigerant decompressed by the second expansion valve 19 flows into the interior evaporator 20, and absorbs heat from the air blown from the blower 32 to evaporate itself (as indicated from the point f35 to a point g35 in FIG. 35). In this way, the air is cooled. The refrigerant flowing from the interior evaporator 20 is drawn into the compressor 11 via the merging portion 15b, and compressed again (as indicated from the point h35 to a point a35 in FIG. 35).

As mentioned above, in the first mode, the air cooled and dehumidified by the interior evaporator 20 can be heated by the interior condenser 12 and blown into the vehicle interior. Thus, the dehumidification-air heating of the vehicle interior can be achieved.

At this time, in the first mode, the third expansion valve 25 is in the throttle state, so that the temperature of the refrigerant flowing into the exterior heat exchanger 14 can be decreased as compared to in the air cooling mode. Thus, a difference between the refrigerant temperature in the exterior heat exchanger 14 and the outside air temperature can be decreased to reduce the amount of dissipation of heat in the exterior heat exchanger 14.

As a result, the refrigerant pressure in the interior condenser 12 can be increased without increasing the number of revolutions of the compressor 11 (refrigerant discharge capacity) as compared to the air cooling mode. That is, the heating capacity of air in the interior condenser 12 can be increased without unnecessarily increasing the power consumption of the compressor 11.

(2) Second Mode

The second mode is performed when the target outlet temperature TAO is higher than a first reference temperature, and equal to or less than a second predetermined reference temperature in the second air heating mode. In the second mode, the air conditioning controller decreases the opening degree of the third expansion valve 25 and increases the opening degree of the second expansion valve 19, as compared to that in the first mode, such that the temperature of refrigerant flowing out of the third expansion valve 25 is lower than the outside air temperature.

Figure 36:
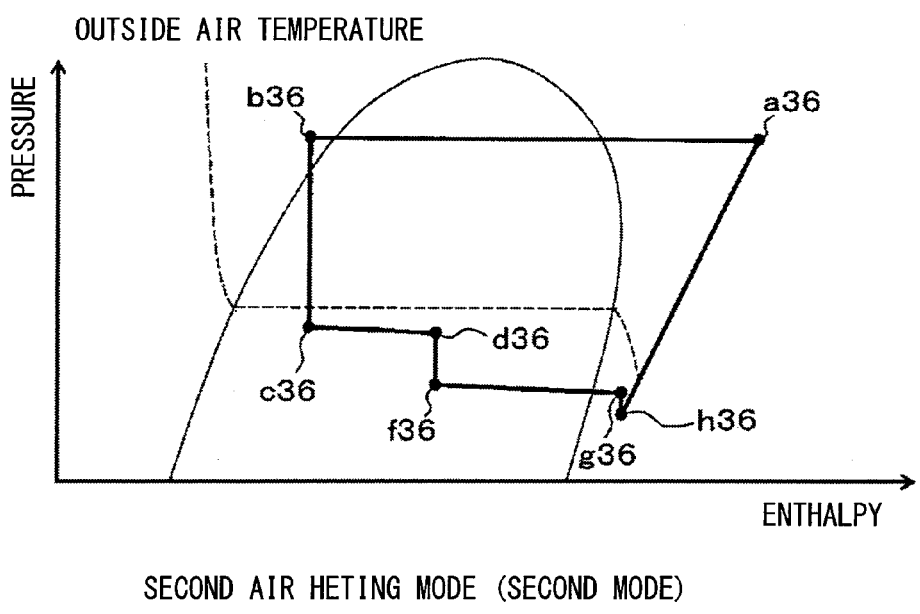
FIG. 36 is a Mollier chart showing the state of refrigerant in a second mode of the second air heating mode of the refrigeration cycle device in the twelfth embodiment.

Therefore, in the second mode, as shown in the Mollier chart of FIG. 36, the high-pressure refrigerant (as indicated by a point a36) discharged from the compressor 11 flows into the interior condenser 12, and then cooled by the interior evaporator 20 to exchange heat with the air dehumidified, thereby dissipating heat therefrom (as indicated from the point a36 to a point b36 in FIG. 5). Thus, the air is heated. Further, the refrigerant flowing out of the interior condenser 12 flows into the third expansion valve 25, and is then decompressed to an intermediate-pressure refrigerant (as indicated from the point b36 to a point c36 in FIG. 36).

Then, the intermediate-pressure refrigerant decompressed by the third expansion valve 25 flows into the exterior heat exchanger 14, and absorbs heat from the outside air blown from the blower fan (as indicated from the point c36 to a point d36 in FIG. 36). The refrigerant flowing from the exterior heat exchanger 14 flows into the second expansion valve 19 via the accumulator 17, and is decompressed by the second expansion valve 19 into a low-pressure refrigerant (as indicated from the point d36 to a point f36 in FIG. 36).

The low-pressure refrigerant decompressed by the second expansion valve 19 flows into the interior evaporator 20, and absorbs heat from the air blown from the blower 32 to evaporate itself (as indicated from the point f36 to a point g36 in FIG. 36). In this way, the air is cooled. The operations following this step will be the same as those in the first mode.

As mentioned above, in the second mode, the air cooled and dehumidified by the interior evaporator 20 can be heated by the interior condenser 12 and blown into the vehicle interior, like the first mode. Thus, the dehumidification-air heating of the vehicle interior can be achieved.

At this time, in the second mode, the opening degree of the third expansion valve 25 is decreased, so that the exterior heat exchanger 14 serves as an evaporator. Therefore, it can increase the amount of heat absorption by the refrigerant as compared to in the first mode, thereby increasing the density of the refrigerant drawn by the compressor 11.

As a result, the refrigerant pressure in the interior condenser 12 can be increased without increasing the number of revolutions of the compressor 11 (refrigerant discharge capacity) as compared to the first mode. That is, the heating capacity of air in the interior condenser 12 can be increased without unnecessarily increasing the power consumption of the compressor 11.

(3) Third Mode

The third mode is performed when the target outlet temperature TAO is higher than a second reference temperature in the second air heating mode. In the third mode, the air conditioning controller decreases the opening degree of the third expansion valve 25 as compared to in the second mode, thereby fully opening the second expansion valve 19. Thus, in the third mode, the state of refrigerant circulating through the cycle changes as shown in the Mollier chart of FIG. 37.

Figure 37:
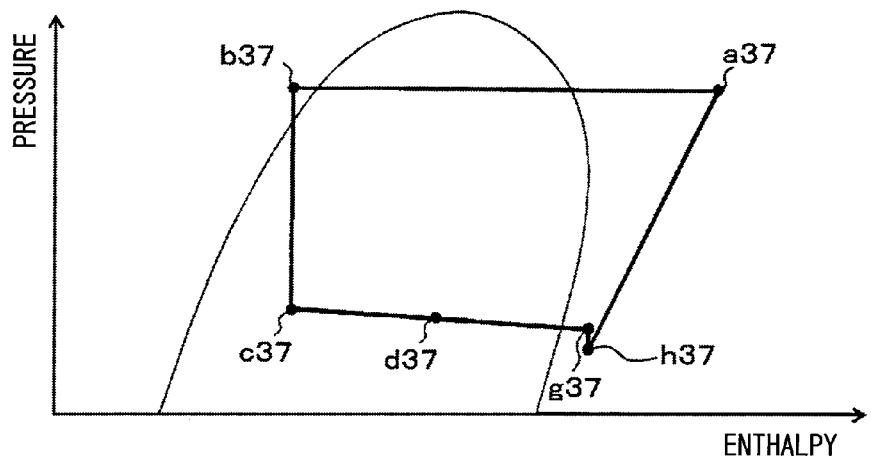
FIG. 37 is a Mollier chart showing the state of refrigerant in a third mode of the second air heating mode of the refrigeration cycle device in the twelfth embodiment.

That is, as shown in FIG. 37, the high-pressure refrigerant (as indicated by a point a37) discharged from the compressor 11 flows into the interior condenser 12, and then cooled by the interior evaporator 20 to exchange heat with the air dehumidified, thereby dissipating heat therefrom (from the point a37 to a point b37 in FIG. 37). Thus, the air is heated. The refrigerant flowing from the interior condenser 12 flows into the third expansion valve 25, and is then decompressed into a low-pressure refrigerant whose pressure is lower than that in the air cooling mode (as indicated from the point b37 to a point c37 in FIG. 37).

Then, the low-pressure refrigerant decompressed by the third expansion valve 25 flows into the exterior heat exchanger 14, and absorbs heat from the outside air blown from the blower fan (as indicated from the point c37 to a point d37 in FIG. 37). The refrigerant flowing from the exterior condenser 14 flows into the second expansion valve 19 via the accumulator 17. At this time, in the third mode, the second expansion valve 19 is fully opened, so that the refrigerant having flowed into the second expansion valve 19 simply flows into the interior evaporator 20 without being decompressed by the second expansion valve 19.

The low-pressure refrigerant flowing into the interior evaporator 20 absorbs heat from the air blown from the blower 32 to evaporate itself (as indicated from the point d37 to a point g37 in FIG. 37). In this way, the air is cooled. The operations following this step will be the same as those in the first mode. In the third mode, the accumulator 17 serves as a simple refrigerant passage, like the sixth embodiment.

Therefore, in the third mode, the air cooled and dehumidified by the interior evaporator 20 can be heated by the interior condenser 12 and blown into the vehicle interior, like the first and second modes. Thus, the dehumidification and heating of the vehicle interior can be achieved.

At this time, in the third mode, like the second mode, the exterior heat exchanger 14 serves as an evaporator, and the opening degree of the third expansion valve 25 is reduced as compared to that in the second mode. Therefore, it can decrease the refrigerant evaporation temperature in the exterior heat exchanger 14. Thus, a difference between the refrigerant temperature in the exterior heat exchanger 14 and the outside air temperature can be enlarged as compared to in the second mode, thereby increasing the amount of heat absorbed in the refrigerant by the exterior heat exchanger 14.

As a result, the refrigerant pressure in the interior condenser 12 can be increased without increasing the number of revolutions of the compressor 11 (refrigerant discharge capacity) as compared to in the second mode. That is, the heating capacity of air in the interior condenser 12 can be increased without unnecessarily increasing the power consumption of the compressor 11.

The refrigeration cycle device 10 of this embodiment operates as mentioned above, and thus can suppress the increase in difference between the temperature of the refrigerant in the accumulator 17 and the outside air temperature in the air cooling mode and air heating mode in the same manner as that in the tenth embodiment. In the first and second modes of the second air heating mode, the refrigerant exchanging heat with the outside air in the exterior heat exchanger 14 flows into the accumulator 17, so that the refrigerant temperature in the accumulator 17 can be set equal to the outside air temperature. In the third mode, the accumulator 17 simply serves as a refrigerant passage.

Thus, even when switching to any operation mode, the increase in difference between the refrigerant temperature in the accumulator 17 disposed in the external space and the outside air temperature can be reduced to thereby suppress the degradation of performance of the refrigeration cycle device 10 due to the unnecessary transfer of heat between the refrigerant in the accumulator 17 and the outside air.

Thirteenth Embodiment

Figure 38:
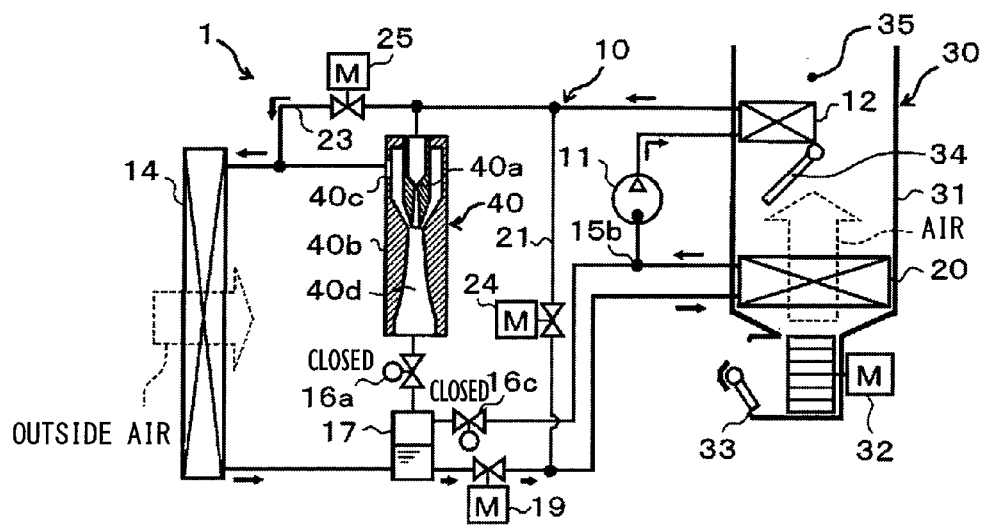
FIG. 38 is an entire configuration diagram showing a refrigerant circuit in an air cooling mode and a second air heating mode of a refrigeration cycle device according to a thirteenth embodiment.
Figure 39:
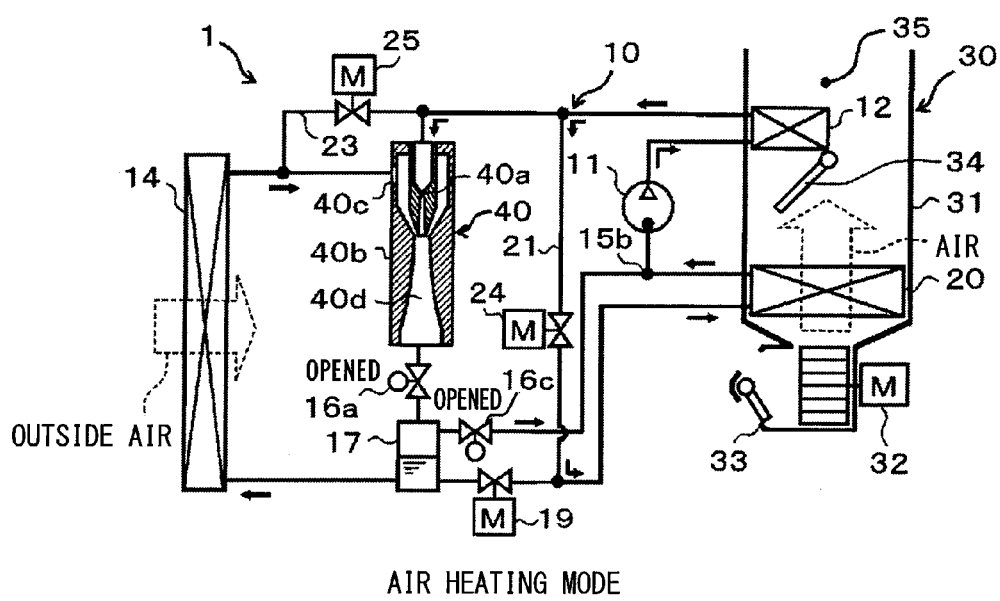
FIG. 39 is an entire configuration diagram showing a refrigerant circuit in an air heating mode of the refrigeration cycle device in the thirteenth embodiment.

This embodiment will describe an example in which a third expansion valve 25 is adopted instead of the ejector side opening/closing valve 16g with respect to the refrigeration cycle device 10 of the eleventh embodiment as shown in the entire configuration diagrams of FIGS. 38 and 39.

Also, in the refrigeration cycle device 10 of this embodiment, the air conditioning controller closes the gas-phase inlet side opening/closing valve 16a and the gas-phase outlet side opening/closing valve 16c, fully closes the bypass passage expansion valve 24, and changes the opening degrees of the third expansion valve 25 and the second expansion valve 19. Thus, it can achieve the same operation as that of the second air heating mode in the twelfth embodiment.

Therefore, the same effects as those in the twelfth embodiment can be obtained. Even when switching to any operation mode, the increase in difference between the refrigerant temperature in the accumulator 17 disposed in the external space and the outside air temperature can be reduced to thereby suppress the degradation of performance of the refrigeration cycle device 10 due to the unnecessary transfer of heat between the refrigerant in the accumulator 17 and the outside air.

Other Embodiments

The present disclosure is not limited to the above embodiments, and various modifications and changes can be made to those embodiments in the following way without departing from the scope of the present disclosure.

(1) Although the refrigeration cycle device 10 in the above-mentioned embodiments is applied to the electric vehicle by way of example, it is obvious that the refrigeration cycle device of the invention may be applied to normal vehicles that obtain a driving force for vehicle traveling from an internal combustion engine (engine), and hybrid vehicles that obtain a driving force for traveling from both an internal combustion engine and electric motor for traveling. In applying the refrigeration cycle device of the invention to the vehicle with the internal combustion engine, a heater core may be provided for heating the air using a coolant of the internal combustion engine as a heat source. Further, the refrigeration cycle device 10 of the present disclosure may be applied to, for example, a stationary air conditioner, a cooler storage container, a liquid heating-cooling equipment, and the like.

(2) Although in the above embodiments, for example, a variable throttle mechanism with a fully opening function is adopted as the first expansion valve 13, the first expansion valve 13 may be constituted of a fixed throttle including an orifice or capillary tube, a bypass passage for bypassing the throttle, and an opening/closing valve for opening and closing the bypass passage. The same goes for other variable throttle mechanisms with the fully opening function.

For example, the bypass passage expansion valve 24 is formed of a variable throttle mechanism with a completely closing function. Alternatively, the bypass passage expansion valve 24 may be constituted of a throttle mechanism (including a fixed throttle) without the completely closing function, and an opening/closing valve for opening and closing a refrigerant passage connected in series to the throttle mechanism. The same goes for other variable throttle mechanisms with the completely closing function.

(3) Although in the above embodiments, the refrigerant circuit switch is constituted of the variable throttle mechanism with the completely closing function, such as the opening/closing valves 16a to 16g, the bypass passage expansion valve 24, and the second expansion valve 19 by way of example, the refrigerant circuit switch is not limited thereto.

For example, the branch portion 15a, the gas-phase inlet side opening/closing valve 16a, and the liquid-phase inlet side opening/closing valve 16b, which have been described above in the first to fifth embodiments, may be removed, and a three way valve may be provided to switch between a refrigerant circuit for connecting the refrigerant outlet side of the exterior heat exchanger 14 with the gas-phase side inflow port of the accumulator 17, and another refrigerant circuit for connecting the refrigerant outlet side of the exterior heat exchanger 14 with the liquid-phase side inflow port of the accumulator 17.

The bypass passage opening/closing valve 16e, which have been described in the second and fifth embodiments, may be removed. Further, a three-way valve may be provided to switch between a refrigerant circuit for connecting the refrigerant outlet side of the interior condenser 12 with the inlet side of the first expansion valve 13, and another refrigerant circuit for connecting the refrigerant outlet side of the interior condenser 12 and the inlet side of the bypass passage 21. Alternatively, a three-way valve may be provided to switch between a refrigerant circuit for connecting between the inlet side of the bypass passage 21 and the inlet side of the second expansion valve 19, and another refrigerant circuit for connecting the outlet side of the liquid-phase outlet side opening/closing valve 16d with the inlet side of the second expansion valve 19.

The ejector side opening/closing valve 16g, which has been explained in the tenth and eleventh embodiments, may be removed, and a three-way valve may be provided to switch between a refrigerant circuit for connecting the refrigerant outlet side of the interior condenser 12 with one of the refrigerant inflow and outflow ports of the exterior heat exchanger 14, and another refrigerant circuit for connecting the refrigerant outlet side of the interior condenser 12 with the inlet side of the nozzle 40a of the ejector 40.

The member 24, which has been explained in the eleventh and thirteenth embodiments, may be removed, and a three-way type flow rate adjustment valve may be disposed in a merging portion between the outlet side of the bypass passage 21 and a refrigerant passage leading from the outlet side of the second expansion valve 19 to the refrigerant inlet side of the interior evaporator 20.

(4) In the above second and fifth embodiments, the fixed throttle 22 is disposed on the refrigerant outlet side of the interior evaporator 20 by way of example. Alternatively, the fixed throttle 22 may be removed and an evaporation pressure adjustment valve may be used to set a refrigerant pressure of the interior evaporator 20 to a predetermined value or higher.

This kind of evaporation pressure adjustment valve for use can be, specifically, one which includes a valve body for adjusting the opening degree of a refrigerant passage formed therein, and an elastic member applying a load on the valve body toward the side that closes the refrigerant passage. The evaporation pressure adjustment valve can be used which is configured to increase the opening degree of the valve with increasing difference in pressure, which is obtained by subtracting an outside air pressure applied to the elastic member side from the refrigerant pressure on the inlet side of the refrigerant passage.

(5) In the above tenth and eleventh embodiments, the nozzle 40a of the ejector 40 adopts a fixed nozzle whose throttle passage area is fixed. However, the nozzle 40a may adopt a variable nozzle whose throttle passage area is changeable.

As such a variable nozzle, a nozzle can be used which includes, specifically, a needle valve disposed inside the nozzle and adapted to adjust the refrigerant passage area of the nozzle, and a driving portion for displacing the needle valve in the axial direction of the nozzle. In the air heating mode, the refrigerant passage area of the variable nozzle may be changed such that the supercooling degree of the refrigerant on the outlet side of the interior condenser 12 approaches the target supercooling degree KSC.

Further, a variable nozzle with a completely closing function may be used that can lose the nozzle by use of the needle valve. In this case, the gas-phase inlet side opening/closing valve 16a may be removed, and the variable nozzle may be completely closed in the air cooling mode, so that the ejector 40 serves as the refrigerant circuit switch. In this way, when the gas-phase inlet side opening/closing valve 16a is removed, the accumulator 17 may be integrated with the outlet side of the diffuser 40d of the ejector 40.

(6) In the above tenth to thirteenth embodiments, a decompression device for decompressing the refrigerant (for example, a fixed throttle comprised of an orifice, a capillary tube, or the like) may be disposed in the refrigerant passage leading from the liquid-phase refrigerant outflow port of the accumulator 17 to the exterior heat exchanger 14. Specifications of the decompression device for decompression of the refrigerant (amount of decompression) may be determined according to pressure increasing performance (pressure increasing amount) of the diffuser 40d of the ejector 40.

What is claimed is:

1. A refrigeration cycle device comprising:
a compressor compressing and discharging a refrigerant;
a heating heat exchanger that exchanges heat between a high-pressure refrigerant discharged from the compressor and a fluid to be heat-exchanged, to heat the fluid to be heat-exchanged;
a first decompression device and a second decompression device that decompress a refrigerant on a downstream side of the heating heat exchanger;
a cooling heat exchanger that exchanges heat between the refrigerant flowing out of the second decompression device and the fluid to be heat-exchanged, to cool the fluid to be heat-exchanged, while allowing the refrigerant to flow into a suction side of the compressor;
a gas-liquid separator disposed in an external space exposed to an outside air, and separating the refrigerant into gas and liquid phases;
an exterior heat exchanger exchanging heat between the refrigerant on the downstream side of the heating heat exchanger and the outside air; and
a refrigerant circuit switch switching between refrigerant circuits for circulation of the refrigerant through a cycle, wherein
in a cooling mode of cooling the fluid to be heat-exchanged,
the high-pressure refrigerant flows into the gas-liquid separator via the first decompression device, and
the refrigerant circuit switch performs switching to a refrigerant circuit in which the refrigerant flowing out of the heating heat exchanger flows into the exterior heat exchanger, and the refrigerant flowing out of the exterior heat exchanger flows into the gas-liquid separator, and
in a heating mode of heating the fluid to be heat-exchanged,
the refrigerant on the downstream side of the heating heat exchanger is decompressed by the first decompression device to a lower pressure than that in the cooling mode, and then flows into the gas-liquid separator, and
the refrigerant circuit switch performs switching to a refrigerant circuit in which the first decompression device decompresses the refrigerant flowing out of the heating heat exchanger, and then allows the refrigerant decompressed by the first decompression device to flow into the gas-liquid separator.

2. A refrigeration cycle device comprising:
a compressor compressing and discharging a refrigerant;
a heating heat exchanger that exchanges heat between a high-pressure refrigerant discharged from the compressor and a fluid to be heat-exchanged, to heat the fluid to be heat-exchanged;
a first decompression device and a second decompression device that decompress a refrigerant on a downstream side of the heating heat exchanger;
a cooling heat exchanger that exchanges heat between the refrigerant flowing out of the second decompression device and the fluid to be heat-exchanged, to cool the fluid to be heat-exchanged, while allowing the refrigerant to flow into a suction side of the compressor;
a gas-liquid separator disposed in an external space exposed to an outside air, and separating the refrigerant into gas and liquid phases;
an exterior heat exchanger exchanging heat between the refrigerant on the downstream side of the heating heat exchanger and the outside air; and
a refrigerant circuit switch switching between refrigerant circuits for circulation of the refrigerant through a cycle, wherein
in a cooling mode of cooling the fluid to be heat-exchanged,
the high-pressure refrigerant flows into the gas-liquid separator without being decompressed by the first decompression device, and then is decompressed by the second decompression device, and
the refrigerant circuit switch performs switching to a refrigerant circuit in which the refrigerant flowing out of the heating heat exchanger flows into the exterior heat exchanger, and the refrigerant flowing out of the exterior heat exchanger flows into the gas-liquid separator, and
in a heating mode of heating the fluid to be heat-exchanged,
the refrigerant on the downstream side of the heating heat exchanger is decompressed by the first decompression device to a lower pressure than that in the cooling mode, and then flows into the gas-liquid separator, and
the refrigerant circuit switch performs switching to a refrigerant circuit in which the first decompression device decompresses the refrigerant flowing out of the heating heat exchanger, and then allows the refrigerant decompressed by the first decompression device to flow into the gas-liquid separator.

3. The refrigeration cycle device according to claim 1, wherein
in the cooling mode, the refrigerant circuit switch performs switching to a refrigeration circuit that allows a liquid-phase refrigerant separated by the gas-liquid separator to flow into the second decompression device.

4. The refrigeration cycle device according to claim 3, wherein in the heating mode, the refrigerant circuit switch performs switching to a refrigeration circuit that allows a low-pressure refrigerant decompressed by the first decompression device to flow into the gas-liquid separator via the exterior heat exchanger, and further allows a liquid-phase refrigerant separated by the gas-liquid separator to flow into the second decompression device.

5. The refrigeration cycle device according to claim 1, further comprising:
an auxiliary exterior heat exchanger that exchanges heat between a liquid-phase refrigerant separated by the gas-liquid separator and the outside air, wherein
in the cooling mode, the refrigerant circuit switch performs switching to a refrigeration circuit that allows the liquid-phase refrigerant separated by the gas-liquid separator to flow into the auxiliary exterior heat exchanger, and further allows a refrigerant flowing out of the auxiliary exterior heat exchanger to flow into the second decompression device.

6. The refrigeration cycle device according to claim 5, wherein
in the heating mode, the refrigerant circuit switch performs switching to a refrigerant circuit that allows a low-pressure refrigerant decompressed by the first decompression device to flow into the gas-liquid separator via the exterior heat exchanger, allows a liquid-phase refrigerant separated by the gas-liquid separator to flow into the auxiliary exterior heat exchanger, and further allows the refrigerant flowing out of the auxiliary heat exchanger to flow into the second decompression device.

7. The refrigeration cycle device according to claim 1, wherein
the first decompression device is an ejector that draws a refrigerant from a refrigerant suction port by a flow of a refrigerant jetted at a high velocity from a nozzle for decompressing the refrigerant, and mixes the jetted refrigerant with the drawn refrigerant from the refrigerant suction port, thereby increasing a pressure of the mixed refrigerant,
in the heating mode, the refrigerant circuit switch performs switching to a refrigerant circuit that decompresses a refrigerant flowing out of the heating heat exchanger by the nozzle, allows the low-pressure refrigerant decompressed by the nozzle to flow into the gas-liquid separator, allows a liquid-phase refrigerant separated by the gas-liquid separator to flow into the exterior heat exchanger, and further draws the refrigerant flowing out of the exterior heat exchanger via the refrigerant suction port, and
in the cooling mode, the refrigerant circuit switch performs switching to a refrigeration circuit that allows a liquid-phase refrigerant separated by the gas-liquid separator to flow into the second decompression device.

8. The refrigeration cycle device according to claim 7, further comprising:
a third decompression device that decompresses a refrigerant flowing out of the heating heat exchanger and causes the decompressed refrigerant to flow out toward a refrigerant inlet side of the exterior heat exchanger, wherein
in a second heating mode of heating the fluid to be heat-exchanged with a lower heating capacity than that in the heating mode, the refrigerant circuit switch decompresses the refrigerant on the downstream side of the heating heat exchanger by the third decompression device, and allows the refrigerant decompressed by the third decompression device to flow into the gas-liquid heat exchanger via the exterior heat exchanger.

9. The refrigeration cycle device according to claim 3, further comprising:
a bypass passage that guides a refrigerant flowing out of the heating heat exchanger toward an inlet side of the second decompression device, wherein
a bypass passage opening/closing portion opening and closing the bypass passage is provided as the refrigerant circuit switch, and
the bypass passage opening/closing portion opens the bypass passage in the heating mode.

10. The refrigeration cycle device according to claim 2, wherein
in the cooling mode, the refrigerant circuit switch performs switching to a refrigeration circuit that allows a liquid-phase refrigerant separated by the gas-liquid separator to flow into the second decompression device.

11. The refrigeration cycle device according to claim 10, wherein
in the heating mode, the refrigerant circuit switch performs switching to a refrigeration circuit that allows a low-pressure refrigerant decompressed by the first decompression device to flow into the gas-liquid separator via the exterior heat exchanger, and further allows a liquid-phase refrigerant separated by the gas-liquid separator to flow into the second decompression device.

12. The refrigeration cycle device according to claim 2, further comprising:
an auxiliary exterior heat exchanger that exchanges heat between a liquid-phase refrigerant separated by the gas-liquid separator and the outside air, wherein
in the cooling mode, the refrigerant circuit switch performs switching to a refrigeration circuit that allows the liquid-phase refrigerant separated by the gas-liquid separator to flow into the auxiliary exterior heat exchanger, and further allows a refrigerant flowing out of the auxiliary exterior heat exchanger to flow into the second decompression device.

13. The refrigeration cycle device according to claim 12, wherein
in the heating mode, the refrigerant circuit switch performs switching to a refrigerant circuit that allows a low-pressure refrigerant decompressed by the first decompression device to flow into the gas-liquid separator via the exterior heat exchanger, allows a liquid-phase refrigerant separated by the gas-liquid separator to flow into the auxiliary exterior heat exchanger, and further allows the refrigerant flowing out of the auxiliary heat exchanger to flow into the second decompression device.

14. The refrigeration cycle device according to claim 2, wherein
the first decompression device is an ejector that draws a refrigerant from a refrigerant suction port by a flow of a refrigerant jetted at a high velocity from a nozzle for decompressing the refrigerant, and mixes the jetted refrigerant with the drawn refrigerant from the refrigerant suction port, thereby increasing a pressure of the mixed refrigerant,
in the heating mode, the refrigerant circuit switch performs switching to a refrigerant circuit that decompresses a refrigerant flowing out of the heating heat exchanger by the nozzle, allows the low-pressure refrigerant decompressed by the nozzle to flow into the gas-liquid separator, allows a liquid-phase refrigerant separated by the gas-liquid separator to flow into the exterior heat exchanger, and further draws the refrigerant flowing out of the exterior heat exchanger via the refrigerant suction port, and in the cooling mode, the refrigerant circuit switch performs switching to a refrigeration circuit that allows a liquid-phase refrigerant separated by the gas-liquid separator to flow into the second decompression device.

15. The refrigeration cycle device according to claim 14, further comprising:

a third decompression device that decompresses a refrigerant flowing out of the heating heat exchanger and causes the decompressed refrigerant to flow out toward a refrigerant inlet side of the exterior heat exchanger, wherein in a second heating mode of heating the fluid to be heat-exchanged with a lower heating capacity than that in the heating mode, the refrigerant circuit switch decompresses the refrigerant on the downstream side of the heating heat exchanger by the third decompression device, and allows the refrigerant decompressed by the third decompression device to flow into the gas-liquid heat exchanger via the exterior heat exchanger.

16. The refrigeration cycle device according to claim 10, further comprising:

a bypass passage that guides a refrigerant flowing out of the heating heat exchanger toward an inlet side of the second decompression device, wherein a bypass passage opening/closing portion opening and closing the bypass passage is provided as the refrigerant circuit switch, and the bypass passage opening/closing portion opens the bypass passage in the heating mode.

* * * * *